US010481287B2

(12) United States Patent
Diallo

(10) Patent No.: US 10,481,287 B2
(45) Date of Patent: Nov. 19, 2019

(54) SURFACE CONSISTENT STATICS SOLUTION AND AMPLIFICATION CORRECTION

(71) Applicant: Saudi Arabian Oil Company, Dhahran (SA)

(72) Inventor: Mamadou Sanou Diallo, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 660 days.

(21) Appl. No.: 15/229,669

(22) Filed: Aug. 5, 2016

(65) Prior Publication Data

US 2018/0038976 A1    Feb. 8, 2018

(51) Int. Cl.
*G01V 1/36* (2006.01)

(52) U.S. Cl.
CPC .......... *G01V 1/362* (2013.01); *G01V 2210/53* (2013.01)

(58) Field of Classification Search
CPC ..... G01V 1/362; G01V 1/364; G01V 2210/53
USPC .......... 702/6, 14, 17; 367/21, 38, 47, 49, 73
See application file for complete search history.

(56) References Cited

U.S. PATENT DOCUMENTS

| | | | |
|---|---|---|---|
| 4,665,510 A | 5/1987 | Foster et al. | |
| 5,479,376 A | 12/1995 | Gonzalez et al. | |
| 5,555,218 A | 9/1996 | Chambers et al. | |
| 7,257,492 B2 * | 8/2007 | Moore | G01V 1/362 702/17 |
| 7,333,393 B2 | 2/2008 | Vossen et al. | |
| 8,095,320 B2 | 1/2012 | Burnstad et al. | |
| 8,139,440 B2 | 3/2012 | Ferber et al. | |
| 8,441,891 B2 | 5/2013 | Ferber et al. | |
| 2014/0244178 A1 | 8/2014 | Pica | |
| 2015/0168573 A1 | 6/2015 | Zhang et al. | |

FOREIGN PATENT DOCUMENTS

WO    2016075550 A1    5/2016

OTHER PUBLICATIONS

Ling, Yun, et al.; "Sand dune reverberation and its suppression" The Leading Edge, May 1998; pp. 697-702.
Al Mutlaq, Mandi H.; "Surface-consistent matching filters for time-lapse processing" University of Calgary Department of Geoscience; Aug. 2013; pp. 1-164.

(Continued)

*Primary Examiner* — John H Le
(74) *Attorney, Agent, or Firm* — Bracewell LLP; Constance G. Rhebergen; Brian H. Tompkins

(57) ABSTRACT

Methods for correcting seismic signals by determining a signature of an outcropping geobody (e.g., a sand dune) from unprocessed seismic data, attenuating the seismic data using a variable gap deconvolution, and performing a surface consistent deconvolution and amplitude correction on the seismic data. A signature associated with the outcropping geobody and corresponding to the geometry of the geobody may be identified from the unprocessed seismic data. The signature may be used in subsequent processing, such for the determination of a variable gap length for a variable gap deconvolution applied to the seismic data. Computer-readable media and systems for correcting seismic signals are also provided.

22 Claims, 10 Drawing Sheets

(56) References Cited

OTHER PUBLICATIONS

Van Vossen, Robbert, et al.; "Surface-consistent deconvolution using reciprocity and waveform inversion" Geophysics, vol. 71, No. 2; Mar.-Apr. 2006; pp. V19-V29.
Van Vossen, R., et al.; "Surface-consistent amplitude corrections for single or multicomponent sources and receivers using reciprocity and waveform inversion" Geophysics Journal International, (2006) 165; pp. 311-322.
Rujie, Zhang, et al.; "Suppressing the sand dune reverberation by the surface consistent predictive deconvolution with the variable predictive gap" SEG Technical Program Expanded Abstracts 2003; pp. 1-4.
Cambois, Guillaume and Stoffa, Paul L.; "Surface-consistent deconvolution in the log/Fournier domain" Geophysics, vol. 57, No. 6 (Jun. 1992); pp. 823-840.
Cary, Peter W. and Lorentz, Gary A.; "Four-component surface-consistent deconvolution" Geophysics, vol. 58, No. 3 (Mar. 1993); pp. 383-392.
International Search Report and Written Opinion for International Application No. PCT/US2017/045007; Report dated Oct. 23, 2017; 13 pages.

\* cited by examiner

SURFACE CONSISTENT STATICS SOLUTION AND AMPLIFICATION CORRECTION

BACKGROUND

Field of the Disclosure

Embodiments of the disclosure generally relate to geophysical exploration and, more particularly, to seismic surveying and the processing of seismic data to account for sand dunes and other outcropping geobodies having a lower acoustic impedance than the surrounding formation.

Description of the Related Art

In geophysical exploration, such as the exploration for hydrocarbons, seismic surveys are performed to produce images of the various rock formations in the earth. The seismic surveys obtain seismic data indicating the response of the rock formations to the travelling of elastic wave seismic energy. For example, seismic energy waves from an energy source are propagated through the Earth's subsurface and are at least partially reflected through the Earth's subsurface upon being propagated through various forms of subterranean matter having different acoustic impedances. Particularly, when seismic wave energy encounters a boundary between two different materials with different acoustic impedances, at least some of the energy will be reflected off the boundary. The reflected seismic energy can then be received at predetermined locations, such as on land, within the sea, or in boreholes using strategically positioned sensors to receive the seismic energy as a signal and to collect and to record data concerning the received seismic energy.

The received seismic data, which may include properties such as the arrival time and the magnitude of the reflected energy, is then processed and analyzed to produce the images in both time and depth domains of the formations and their locations in an area of interest beneath the earth's surface. For example, changes in signal properties allow inferences regarding changes in seismic impedances, which thereby allow inferences regarding the properties of the underlying geologic structure.

Generally, seismic imaging requires directing an intense sound from a seismic energy source device (referred to as a "source") into the ground to evaluate subsurface conditions and to detect possible concentrations of hydrocarbons or other subsurface minerals. Seismic sensor devices, such as geophones and hydrophones among others, record sound wave echoes that come back up through the ground to the recording surface. Conventional seismic acquisition systems use an array of strategically positioned seismic sensors; the array is also called a receiver and is typically composed of between 6 and 24 sensors. Such seismic sensor devices, such as geophones and hydrophones, can record the intensity of such seismic waves and the time it took for the seismic wave to travel from the seismic source device back to the recording device at the recording position. The reflections of seismic waves emitted by the seismic source device, and recorded by the recording device, can be processed by a computer to generate a three-dimensional digital model, or seismic image, of the subsurface. The three-dimensional model of the subsurface can be used to identify, for example, the placement of reservoirs and potential well flow paths During seismic surveys, the shallow or near surface part of the earth is where most of the complexities are concentrated, due to the existence of phenomena such as weathering and geomorphological processes. Sand dunes and other outcropping geobodies may create challenges in processing the received seismic data. Such outcropping geobodies may introduce various distortion effects that affect characteristics of reflection events of interest recorded by receiver stations positioned on such geobodies. Moreover, ensuring that the processing of such seismic data is amplitude versus offset (AVO) compliant for subsequent interpretation of the seismic data may also be challenging.

SUMMARY

In some embodiments, a method of producing corrected seismic data from seismic data generated from a plurality of seismic receiver stations configured to sense seismic signals originating from a plurality of seismic source stations is provided. At least one of the plurality of seismic source stations or one of the plurality of seismic receiver stations is positioned on an outcropping geobody. The method includes obtaining, by a processor, at least one seismic trace that includes unprocessed seismic data, identifying, from the unprocessed seismic data, a signature associated with the geobody, the signature corresponding to a geometry of the geobody, and performing, by the processor, a variable gap deconvolution to attenuate the signature and generate processed seismic data without near-surface reverberations caused by the outcropping geobody. The method further includes performing, by the processor, a frequency-dependent amplitude correction on the processed seismic data to produce corrected seismic data.

In some embodiments, the outcropping geobody is a sand dune. In some embodiments, identifying, from unprocessed seismic data, a signature associated with the geobody includes performing image-recognition on the unprocessed seismic data to identify the signature. In some embodiments, performing a variable gap deconvolution to attenuate the signature and generate processed seismic data includes determining a variable gap length from the signature.

In some embodiments, at least one of the plurality of seismic source stations or plurality of seismic receiver stations is positioned on a near-surface feature having less distortion effects than the outcropping geobody and the corrected seismic data includes first corrected seismic data. In such embodiments, the method includes performing, by the processor, a surface consistent deconvolution and amplitude correction on the corrected seismic data to produce second corrected seismic data. In such embodiments, performing the surface consistent deconvolution and amplitude correction on the first corrected seismic data to produce second corrected seismic data includes scaling a surface consistent receiver term by a source term, the receiver term corresponding to one of the plurality of receiver stations and the source term corresponding to one of the plurality of source stations, determining the scaled surface consistent receiver term, and determining, using the scaled surface consistent receiver term, a surface consistent source waveform and a surface consistent receiver waveform. In such embodiments, performing, by the processor, a surface consistent deconvolution and amplitude correction includes defining as $S(i,j)$ a first seismic trace as a function of time t from an $i^{th}$ source station to a $j^{th}$, such that $S(i,j)$ is $$S(i,j)(t) = s_i(t) * r_j(t) * G_{ij}(t)$$

such that $s_i(t)$ is the waveform component associated with the ith source station, $r_j(t)$ is the waveform component associated with the $j^{th}$ receiver station, and $G_{ij}(t)$ is the waveform component of the earth impulse response between the locations of the $i^{th}$ source station and $j^{th}$ receiver station.

In such embodiments, performing, by the processor, a surface consistent deconvolution and amplitude correction includes defining as S(i,p) a second seismic trace as a function of time t from the $i^{th}$ source and $p^{th}$ receiver, such that S(i,p) is:

$$S(i,p)(t) = s_i(t) * r_p(t) * G_{ip}(t)$$

such that $s_i(t)$ is the waveform component associated with the $i^{th}$ source station, $r_p(t)$ is the waveform component associated with the $j^{th}$ receiver station, and $G_{ip}(t)$ is the waveform component of the earth impulse response between the locations of the $i^{th}$ source station and $j^{th}$ receiver station.

In such embodiments, performing, by the processor, a surface consistent deconvolution and amplitude correction includes defining $\tilde{Q}(i,j,p)(\omega)$ as the amplitude of a ratio of the temporal Fourier transforms of the first seismic trace and the second seismic trace, such that $\tilde{Q}(i,j,p)(\omega)$ is $$\tilde{Q}(i,j,p)(\omega) = \widetilde{S_i r_j}(\omega) + \tilde{G}_{ij}(\omega) - \widetilde{S_i r_p}(\omega) - \tilde{G}_{ip}(\omega)$$

such that $\tilde{r}_{ij}(\omega) = \widetilde{S_i r_j}(\omega) = \ln [|\widehat{s_i}(\omega)\hat{r}_j(\omega)|]$, $\tilde{r}_{ip}(\omega) = \widetilde{S_i r_p}(\omega) = \ln [|\widehat{s_i}(\omega)\hat{r}_p(\omega)|]$, and $\tilde{G}_{ij}(\omega) = \ln [|\widehat{G_{ij}}(\omega)|]$, and $\tilde{G}_{ip}(\omega) = \ln [|\widehat{G_{ip}}(\omega)|]$ where ln is the natural logarithm function.

In such embodiments, performing, by the processor, a surface consistent deconvolution and amplitude correction includes defining p as a last seismic trace of a shot gather, such that $\tilde{Q}(i,j,p)(\omega)$ is:

$$\begin{pmatrix} 1 & 0 & 0 & 0 & \ldots & -1 & 1 & 0 & 0 & 0 & \ldots & -1 \\ 0 & 1 & 0 & 0 & \ldots & -1 & 0 & 1 & 0 & 0 & \ldots & -1 \\ 0 & 0 & 1 & 0 & \ldots & -1 & 0 & 0 & 1 & 0 & \ldots & -1 \\ 0 & 0 & 0 & 1 & \ldots & -1 & 0 & 0 & 0 & 1 & \ldots & -1 \\ . & . & . & & \ldots & -1 & 0 & 0 & 0 & . & \ldots & -1 \\ . & . & . & & \ldots & -1 & 0 & 0 & 0 & . & \ldots & -1 \\ . & . & . & & \ldots & -1 & 0 & 0 & 0 & . & \ldots & -1 \\ . & . & . & & \ldots & -1 & 0 & 0 & 0 & . & \ldots & -1 \\ . & . & . & & \ldots & -1 & 0 & 0 & 0 & . & \ldots & -1 \\ . & . & . & \ldots & 1 & -1 & 0 & 0 & 0 & . & \ldots & 1 & -1 \end{pmatrix} \begin{pmatrix} \tilde{r}_{i1} \\ \tilde{r}_{i2} \\ \tilde{r}_{i3} \\ . \\ . \\ . \\ \tilde{r}_{ip} \\ \tilde{G}(i,1) \\ \tilde{G}(i,2) \\ . \\ . \\ . \\ \tilde{G}(i,p) \end{pmatrix} = \begin{pmatrix} \tilde{Q}(i,1) \\ \tilde{Q}(i,2) \\ \tilde{Q}(i,3) \\ . \\ . \\ . \\ \tilde{Q}(i,p-1) \end{pmatrix}$$

In such embodiments, performing, by the processor, a surface consistent deconvolution and amplitude correction includes defining $\tilde{Q}(i,j,p)(\omega)$ in matrix notation, such that $\tilde{Q}(i,j,p)(\omega)$ is $$\tilde{Q} = A\tilde{X}$$

such that A is a sparse matrix with dimensions $(p-1) \times (2 \times p)$, $\tilde{X}$ is a column vector with $(2 \times p)$ unknowns (consisting of p surface consistent receiver terms scaled by the source term and p earth impulse response components) and $\tilde{Q}$ is a column vector with $(p-1)$ elements.

In such embodiments, performing, by the processor, a surface consistent deconvolution and amplitude correction includes defining the scaled receiver term for each shot i as $\tilde{r}_{ij}(\omega)$, such that $\tilde{r}_{ij}(\omega)$ is $$\begin{pmatrix} 1 & 1 & 0 & 0 & \ldots & 0 & 0 & 0 & 0 & 0 \\ 1 & 0 & 1 & 0 & \ldots & 0 & 0 & 0 & 0 & 0 \\ 1 & 0 & 0 & 0 & \ldots & 0 & 0 & 0 & 0 & 0 \\ 1 & 0 & 0 & 1 & \ldots & 0 & 0 & 0 & 0 & 0 \\ . & . & . & . & \ldots & 0 & 0 & 0 & 0 & 0 \\ . & . & . & . & \ldots & 0 & 0 & 0 & 0 & 0 \\ . & . & . & . & \ldots & 0 & 0 & 0 & 0 & 0 \\ 1 & . & . & . & \ldots & 0 & 0 & 0 & 0 & 0 \end{pmatrix} \begin{pmatrix} \ln[|\hat{s}_i(\omega)|] \\ \ln[|\hat{r}_{ij}|] \\ \ln[|\hat{r}_{ij=1}|] \\ . \\ . \\ . \\ \ln[|\hat{r}_{ip}|] \end{pmatrix} = \begin{pmatrix} \tilde{r}_{ij} \\ \tilde{r}_{i(j+1)} \\ . \\ . \\ . \\ \tilde{r}_{ip-1} \end{pmatrix}$$

In such embodiments, performing, by the processor, a surface consistent deconvolution and amplitude correction includes defining $\tilde{r}_{ij}(\omega)$ in matrix notation, such that $\tilde{r}_{ij}(\omega)$ is:

$$\tilde{R}_i = A_r \tilde{X}_i$$

such that $A_r$ is a sparse matrix with dimensions $(p-1) \times (p+1)$, $\tilde{X}_i$ is a column vector with $p+1$ unknowns (consisting of p surface consistent receiver terms and the source term for shot i).

In some embodiments, a non-transitory computer-readable storage medium having executable code stored thereon for producing corrected seismic data from seismic data generated from a plurality of seismic receiver stations configured to sense seismic signals originating from a plurality of seismic source stations. At least one of the plurality of seismic source stations or one of the plurality of seismic receiver stations is positioned on an outcropping geobody. The executable code includes a set of instructions that causes a processor to perform operations that include obtaining, by the processor, at least one seismic trace that includes unprocessed seismic data, identifying, from the unprocessed seismic data, a signature associated with the geobody, the signature corresponding to a geometry of the geobody, and performing, by the processor, a variable gap deconvolution to attenuate the signature and generate processed seismic data without near-surface reverberations caused by the outcropping geobody. The executable code includes a set of instructions that causes a processor to perform operations that further include performing, by the processor, a frequency-dependent amplitude correction on the processed seismic data to produce corrected seismic data.

In some embodiments, the outcropping geobody is a sand dune. In some embodiments, identifying, from unprocessed seismic data, a signature associated with the geobody includes performing image-recognition on the unprocessed seismic data to identify the signature. In some embodiments, performing a variable gap deconvolution to attenuate the signature and generate processed seismic data includes determining a variable gap length from the signature. In some embodiments, at least one of the plurality of seismic source stations or plurality of seismic receiver stations is positioned on a near-surface feature having less distortion effects than the outcropping geobody and the corrected seismic data includes first corrected seismic data. In such embodiments, the executable code includes a set of instructions that causes a processor to perform operations that further include performing, by the processor, a surface consistent deconvolution and amplitude correction on the corrected seismic data to produce second corrected seismic data. In such embodiments, performing the surface consistent deconvolution and amplitude correction on the first corrected seismic data to produce second corrected seismic data includes scaling a surface consistent receiver term by a source term, the receiver term corresponding to one of the plurality of receiver stations and the source term corresponding to one of the plurality of source stations, determining the scaled surface consistent receiver term, and determining, using the scaled surface consistent receiver term, a surface consistent source waveform and a surface consistent receiver waveform.

In some embodiments, a system is provided that includes a plurality of seismic source stations, such that at least one of the plurality of seismic source stations is positioned on an outcropping geobody and a plurality of seismic receiver stations configured to sense seismic signals originating from the plurality of seismic source stations. The system further includes a seismic data processor and a non-transitory computer-readable storage memory accessible by the seismic data processor and having executable code stored thereon for producing corrected seismic data from seismic data generated from the plurality of seismic receiver stations. The executable code includes a set of instructions that causes the seismic data processor to perform operations that include obtaining, by the processor, at least one seismic trace that includes unprocessed seismic data, identifying, from the unprocessed seismic data, a signature associated with the geobody, the signature corresponding to a geometry of the geobody, and performing, by the seismic data processor, a variable gap deconvolution to attenuate the signature and generate processed seismic data without near-surface reverberations caused by the outcropping geobody. The executable code includes a set of instructions that causes the seismic data processor to perform operations that further include performing, by the seismic data processor, a frequency-dependent amplitude correction on the processed seismic data to produce corrected seismic data.

In some embodiments, the outcropping geobody is a sand dune. In some embodiments, identifying, from unprocessed seismic data, a signature associated with the geobody includes performing image-recognition on the unprocessed seismic data to identify the signature. In some embodiments, performing a variable gap deconvolution to attenuate the signature and generate processed seismic data includes determining a variable gap length from the signature. In some embodiments, at least one of the plurality of seismic source stations or plurality of seismic receiver stations is positioned on a near-surface feature having less distortion effects than the outcropping geobody and the corrected seismic data includes first corrected seismic data. In such embodiments, the executable code includes a set of instructions that causes a processor to perform operations that further include performing, by the processor, a surface consistent deconvolution and amplitude correction on the corrected seismic data to produce second corrected seismic data. In such embodiments, performing the surface consistent deconvolution and amplitude correction on the first corrected seismic data to produce second corrected seismic data includes scaling a surface consistent receiver term by a source term, the receiver term corresponding to one of the plurality of receiver stations and the source term corresponding to one of the plurality of source stations, determining the scaled surface consistent receiver term, and determining, using the scaled surface consistent receiver term, a surface consistent source waveform and a surface consistent receiver waveform.

DETAILED DESCRIPTION

Figure 1:
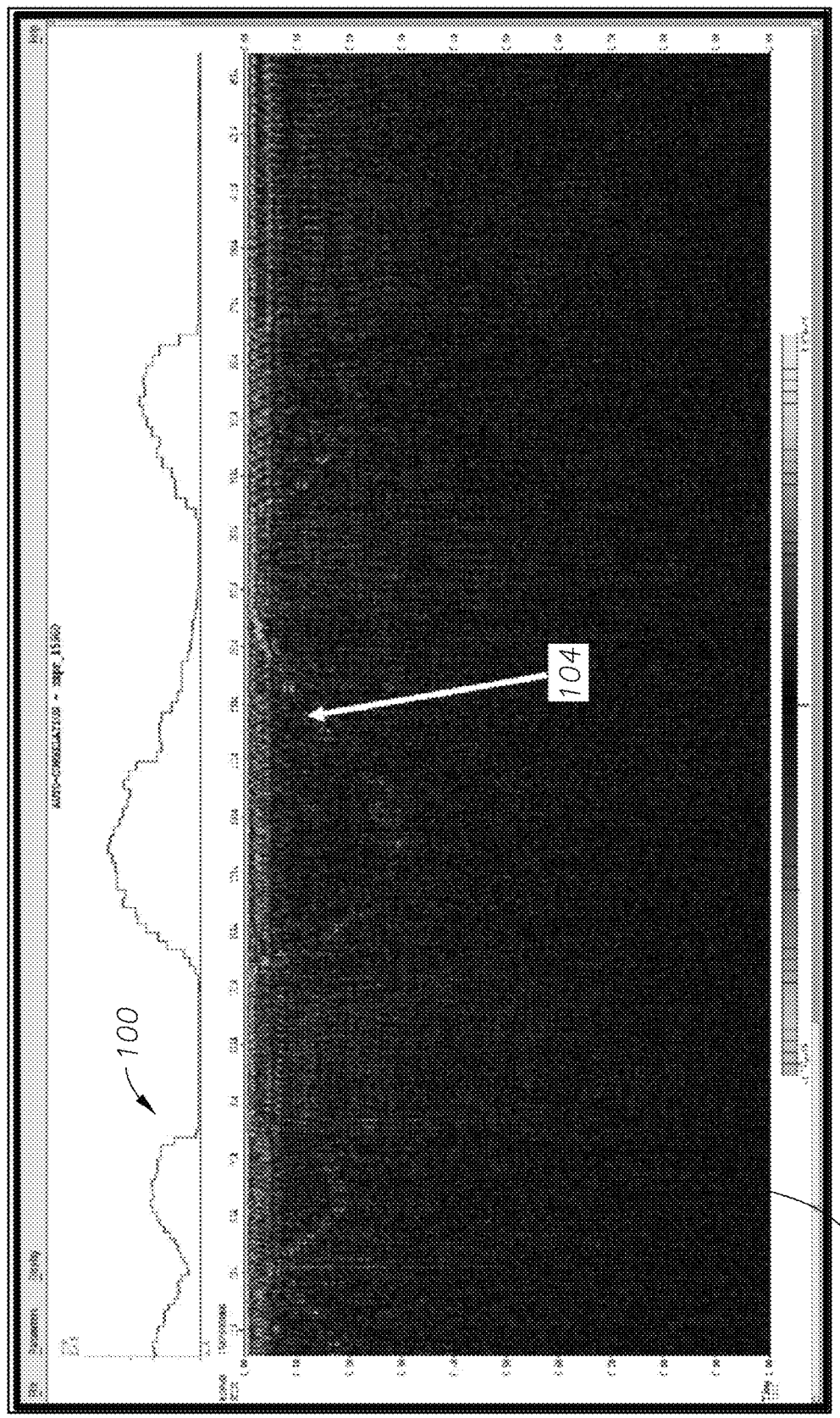
FIG. 1 is an example graph of elevations and an example graph of receiver stations' statics for a group of sand dunes in accordance with an example embodiment of the disclosure.

The present disclosure will now be described more fully hereinafter with reference to the accompanying drawings, which illustrate embodiments of the disclosure. This disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art.

Embodiments of the disclosure include systems, methods, and computer-readable media for correcting seismic signals to attenuate the effect of near-surface geobodies on the seismic reflection data originating from subsurface geological formation which are of interest for hydrocarbon exploration. Embodiments of the disclosure include determining a signature of an outcropping geobody (e.g., a sand dune) from unprocessed seismic data, and processing the seismic data using a variable gap deconvolution, and a surface consistent frequency-dependent amplitude correction. In some embodiments, a seismic trace having unprocessed seismic data may be obtained by emitting seismic energy from a seismic source station (also referred to as "shot" station) and recording that part of the seismic energy that propagates in subsurface formation back to a seismic receiver station. One or more of the seismic source stations or receiver stations may be positioned on one or more outcropping geobodies, such as sand dunes, that have a high contrast of acoustic impedance relative to a surrounding formation. In some embodiments, one or more of the seismic source stations or receiver stations may be positioned on near-surface features having less prominent seismic effects than the one or more outcropping geobodies such as sand dunes.

A signature associated with the outcropping geobody may be identified from the unprocessed seismic data (also referred to as "raw" seismic data). Such unprocessed seismic data may include an autocorrelation of seismic traces along a line of seismic receiver stations and an autocorrelation of seismic traces along a line of seismic source stations. The information from the autocorrelograms may be used to derive the source statics and receiver statics associated with source stations and receiver stations positioned on the outcropping geobody (e.g., a sand dune). In some embodiments, identification of the signature is enhanced by using unprocessed seismic data sorted in a cross-spread configuration and performing receiver stacks and source stacks on the autocorrelation sections associated with the line of receiver stations or line of source stations respectively. The sand dune signature identified from the autocorrelograms of the raw seismic data corresponds to the geometry (and multiples) of the outcropping geobody and enables determination of the geobody's geometry without processing of the unprocessed seismic data. The identified sand dune signature is a mirror image of the sand dune geometry as expressed in two-way travel time between the base and top of the sand dune. The seismic energy trapped between the top and the base boundaries of the sand dune and reflected back and forth between the two boundaries produces multiple replicas of the sand dunes signature. For outcropping geobodies (other than sand dunes) with a lower acoustic impedance compared to the surrounding formation, similar observations can be made as in the sand dune (i.e. geobody-signature as mirror image of the geobody geometry on the autocorrelograms of the raw seismic data along with multiple replicas of the geobody signature.).

A surface consistent variable gap deconvolution may be performed on the seismic data to attenuate the effect of the geobody signature and its multiple replicas. Thus, for a sand dune, the surface consistent variable gap deconvolution may attenuate the sand dune signature and its multiple replicas. In some embodiments, the variable gap length for the variable gap deconvolution may be determined from the signature of the outcropping geobody. In other embodiments, the variable gap length for the variable gap deconvolution may be determined from statics derived from the seismic data according to known techniques.

After application of the surface consistent variable gap deconvolution, a surface consistent frequency-dependent correction may be performed on the attenuated seismic data. The application of the surface consistent variable gap deconvolution followed by the surface consistent frequency dependent amplitude correction as described herein may attenuate the effect of near surface geobodies such as sand dunes on seismic reflection events coming from a subsurface formation of interest.

The input to the surface consistent variable gap deconvolution and surface consistent frequency dependent amplitude correction does not require filtering of coherent noise such as multiples and surface waves, and does not require the application of normal move-out (NMO). Thus, no velocity information is required for application of the surface consistent variable gap deconvolution and surface consistent frequency dependent amplitude correction to remove or attenuate the effect of a near-surface geobody such as a sand dune on seismic reflection events coming from a subsurface formation of interest and obtain corrected seismic data.

In some embodiments, the correction of seismic data may include a surface consistent deconvolution and surface amplitude correction for less prominent near-surface features that have less delay time and amplification effects than outcropping geobodies such as sand dunes. For example, after the correction for the effects of sand dunes or other outcropping geobodies, the surface consistent deconvolution and surface amplitude correction may be applied to seismic data to correct for effects caused by near-surface features having less prominent effects than the sand dunes or other outcropping geobodies. In such embodiments, the correction terms of the surface consistent deconvolution and surface amplitude correction do not depend on the order in which the different convolution terms have been derived. The surface consistent deconvolution may include scaling the surface consistent receiver term by a source term, determining the source scaled consistent receiver term, and determining, the actual source and receiver terms. Using the minimum phase assumption, the surface consistent source waveform and surface consistent receiver waveform may be determined from the amplitudes of the shot and receiver terms respectively.

With the foregoing in mind, FIG. 1 depicts an example graph 100 of elevations and an example graph 102 of receiver stations' statics (by seismic traces along seismic receiver stations) for a group of sand dunes showing a correlation between the elevations and the statics in accordance with an embodiment of the disclosure. As shown in FIG. 1, a sand dune signature 104 may be identified from the unprocessed seismic data. As described herein, the sand dune statics may be directly determined for the sand dune signature without processing of the receiver station statics. For each receiver station along the elevation profile, the corresponding absolute value of sand dune receiver statics is determined as half of the time of the corresponding point on the sand dune signature 104. For example, a point may be selected on the sand dune signature 104 and the corresponding time determined from the vertical axis. The time may be divided by two to obtain the absolute value of the receiver sand dune static at the corresponding receiver elevation on graph 100.

Figure 2:
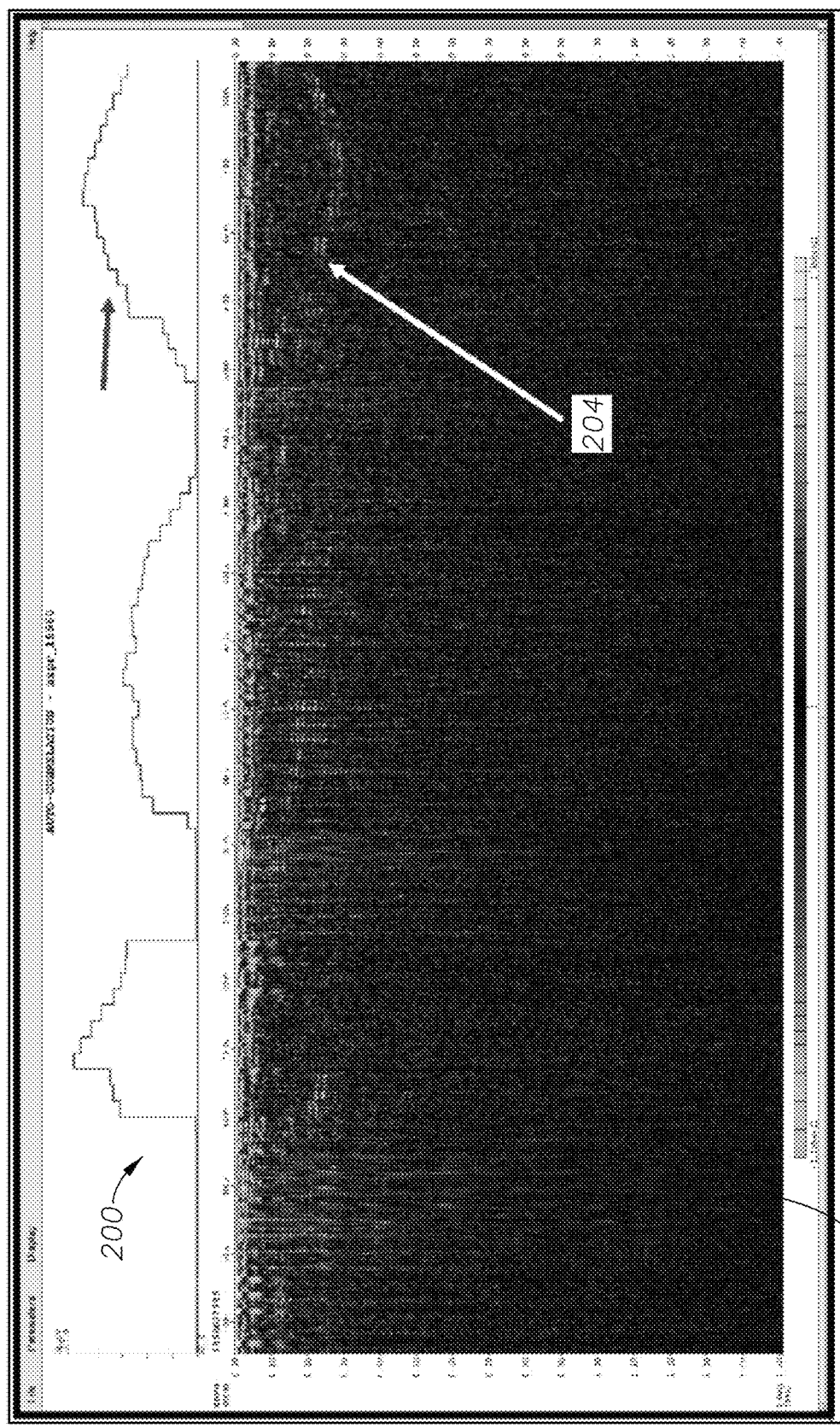
FIG. 2 is an example graph of elevations and an example graph of shot stations statics for the group of sand dunes in accordance with an embodiment of the disclosure.

FIG. 2 depicts an example graph 200 of elevations and an example graph 202 of shot stations statics showing a correlation between the elevations and the sand dune signature along a line of source stations (by correlation of seismic traces along seismic source stations) in accordance with an embodiment of the disclosure. As shown in FIG. 2, a sand dune signature 204 may also be identified from the unprocessed seismic data without processing of the shot station statics. The sand dune statics may be directly determined for the sand dune signature. For each source station along the elevation profile, the corresponding absolute value of sand dune source statics is determined as half of the time of the corresponding point on the signature 204. For example, a point may be selected on the signature 204 and the corresponding time determined from the vertical axis. The time may be divided by two to obtain the absolute value of the source sand dune static at the corresponding source elevation on the graph 204.

Figure 3:
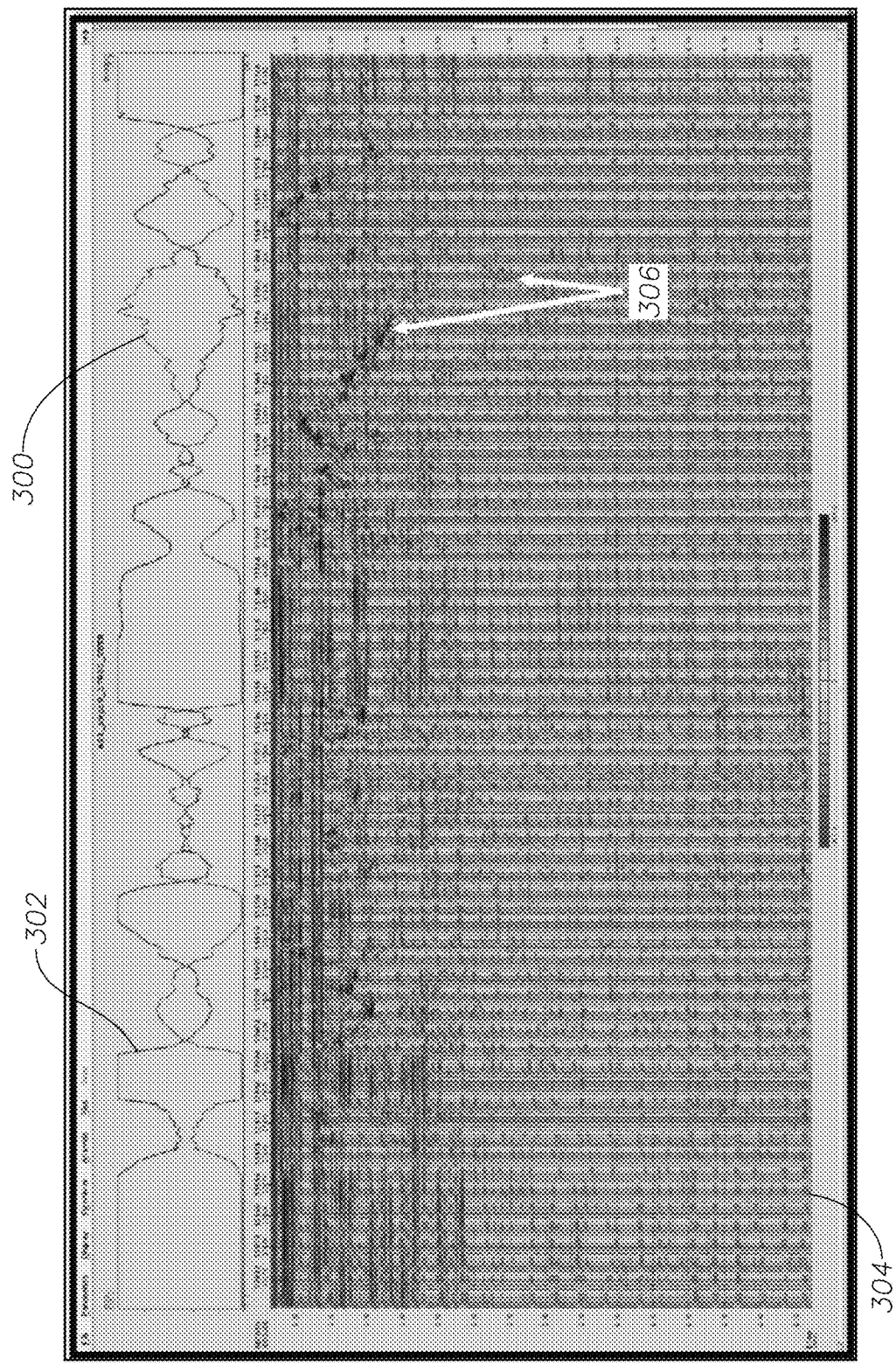
FIG. 3 depicts an example graph of elevations and an example graph of derived sand dune statics in accordance with an embodiment of the disclosure.

FIG. 3 depicts an example graph 300 of elevations and an example graph of derived sand dune statics 302 in accordance with an embodiment of the disclosure. As will be appreciated, the derived sand dune statics 302 may be obtained from an empirical relationship between sand thickness and the vertical one-way travel time through the sand (also referred to as a "sand curve") and may be derived directly from seismic data using the information from the sand dune signature according to the empirical "sand curve". In some embodiments, the sand dune statics may be derived from seismic data using the top curve of the sand dune signature 306. FIG. 3 also depicts a graph 304 of the autocorrelation of a receiver stack from a line of receiver stations in a cross spread configuration. As shown in FIG. 3, a sand dune signature 306 and an example multiple of the sand dune signature may be identified from the seismic data. A portion of the sand dune signature 306 is a mirror image of the sand-curve derived statics 302. The cross spread configuration graph may provide for improved identification of the sand dune signature by stacking of the autocorrelated sections associated to the same receiver stations or source stations.

The sand dune signature 306 and its multiples may be determined directly from the seismic data without any processing. In some embodiments, however, the seismic data may be processed to remove all the nearly horizontal time events to improve identification of a sand dune signature. The sand dune signature 306 and its multiples may enable identification of the geometry of a sand dune directly from the seismic data without processing of the data. It should be appreciated that the signature described herein and identified from seismic data may also apply to other outcropping geobodies having a high contrast of acoustic impedance relative to surrounding formation. As described further below, the amplification effect of sand dunes on seismic signals may be corrected using information from the sand dunes' geometry (as identified using the sand dune signature described above) and elevation.

In some embodiments, a geobody signature such as a sand dune signature (for example, the delay time associated with a sand dune signature) may be determined algorithmically using, for example, automatic picking. In such embodiments, for example, seed points may be automatically or manually selected on a suspected signature in a graph of seismic statics (for example along the signature 104 of graph 102, along the signature 102 of graph 204, or along the signature 306 of the graph 304). Using the seed points, an auto-track algorithm may be executed to pick points along sand dune signature and determine the curve that corresponds to the signature. The determined curve corresponds to the two-way delay time induced by the presence of low velocity geobodies such as sand dunes. As discussed above, the identification of a sand dune signature may be improved by using stacked autocorrelograms, such as shown in FIG. 3. For example, with the receiver stacked autocorrelograms shown in FIG. 3, the amplitude of the sand dune signature 306 is enhanced and, thus, the detectability of the sand dune signature 306 via algorithmic identification (e.g., via image-recognition). Thus, in some embodiments the identification of a sand dune signature may be performed on a receiver stack autocorrelogram or a source stack autocorrelogram.

In some embodiments, the detectability of a sand dune signature may be enhanced by applying a filter to remove long wavelength horizontal events that cut through the sand dune signature and its multiple replicas. In some embodiments, the algorithmic detection of a sand dune signature may be further refined by minimizing the difference between an automatically picked delay time and the time corresponding to the maximum of the envelope along the sand dune signature. At each receiver or source position on a sand dune, the time delay obtained using this technique is double the gap length parameter used to perform the variable gap deconvolution described further herein.

Figure 4:
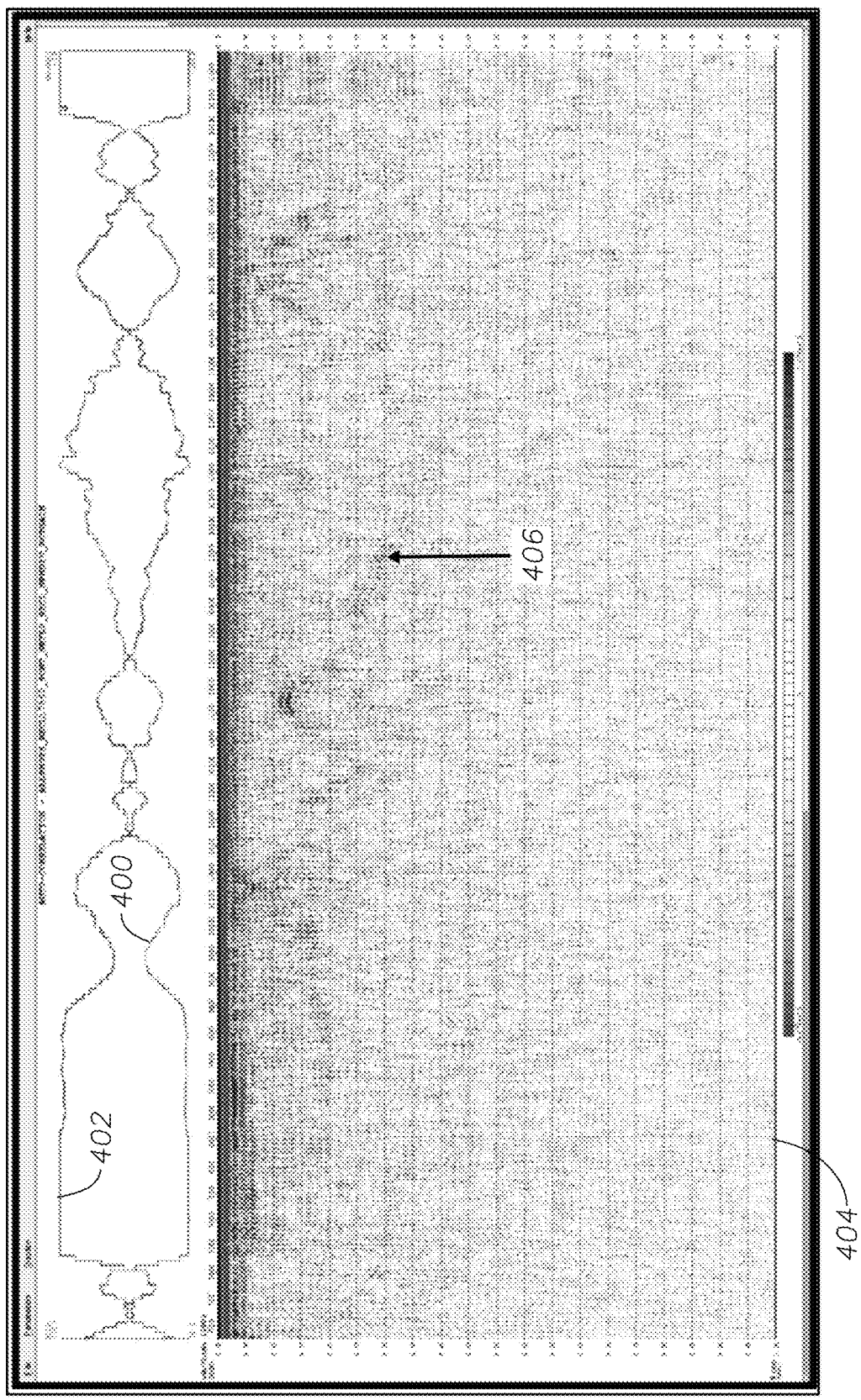
FIG. 4 is an example graph of elevations and an example graph of derived sand dune statics in accordance with an embodiment of the disclosure.
Figure 5:
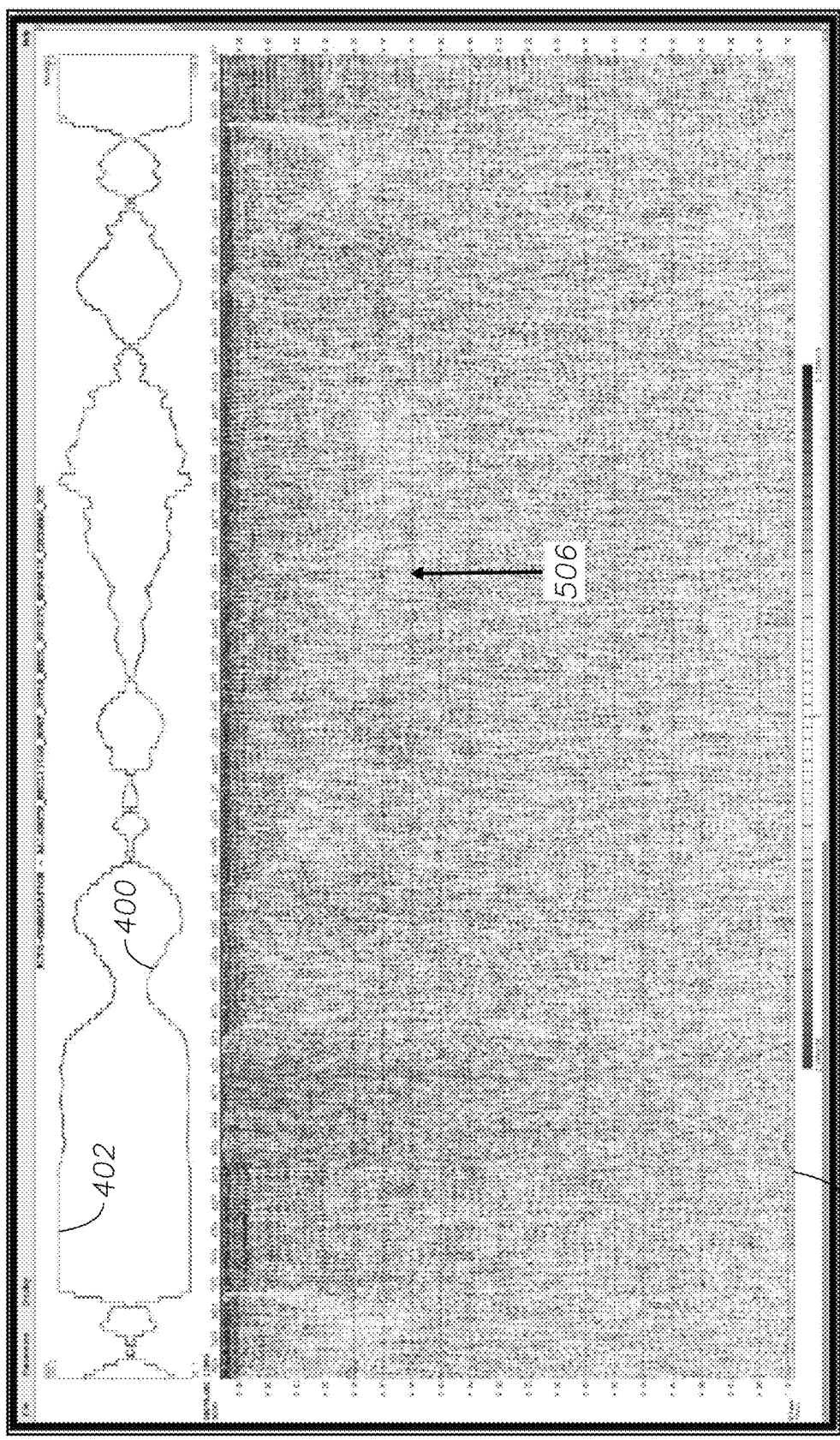
FIG. 5 is an example graph of elevations, an example graph of derived sand dune statics, and an example graph of sand dune statics after application of a variable gap deconvolution to remove a sand dune signature in accordance with an embodiment of the disclosure.

In some embodiments, the correction of seismic data may include a variable gap deconvolution to attenuate a sand dune signature identified directly from unprocessed seismic data in the manner described above. FIGS. 4 and 5 show attenuation of a sand dune signature via a variable gap deconvolution in accordance with an embodiment of the disclosure.

FIG. 4 depicts a graph 400 of elevations and an example graph of derived sand dune statics 402 in accordance with an embodiment of the disclosure. As will be appreciated, the derived sand dune statics 402 may be obtained from an empirical relationship between sand thickness and the vertical one-way travel time through the sand (also referred to as a "sand curve") and may be derived directly from seismic data using the information from the sand dune signature according to the empirical "sand curve". The "sand curve" may provide estimates of the delay times for the static shift due to the presence of sand dunes. In such instances, at each receiver or source position located on a sand dune, the time delay obtained from the empirical sand curve is equal to a gap length parameter used to perform the variable gap deconvolution described further herein.

FIG. 4 also shows a graph of the autocorrelation of unprocessed seismic data 404 and a sand dune signature 406 identified directly from the unprocessed seismic data 404 in accordance with the techniques described herein.

FIG. 5 depicts the graph 400 of elevations, an example graph of derived sand dune statics 402, and an example graph of sand dune statics 504 (obtained from an empirical relationship between sand thickness and the vertical one-way travel time through the sand or "sand curve') after application of a variable gap deconvolution to the seismic data from receiver stations along the elevation graph 400 and from all source stations. As noted above, the sand dune statics 404 depicts the autocorrelation of the seismic traces of theses receiver stations (along a receiver line along the elevation profile 400) before the application variable gap deconvolution. FIG. 5 also depicts a sand dune signature 506 after application of a variable gap deconvolution to attenuate the sand dune signature 406. In some embodiments, the variable gap length may be determined from the derived sand dune statics 402. As discussed above, for example, at each receiver or source position located on a sand dune, the gap length parameter may be equal to the time delay obtained from the empirical sand curve.

In other embodiments, the variable gap length may be determined from the sand dune signature 406, i.e., the geometry of the sand dune observed directly from the signature identified from unprocessed seismic data. As discussed above, for example, at each receiver or source position on a sand dune, the gap length parameter may be one-half of the time delay obtained from a sand dune signature.

As described below, in some embodiments the correction of seismic data may include a surface consistent frequency-dependent amplitude correction to correct for anomalous amplification of seismic signals due to the presence of sand dunes or other outcropping geobodies. Paragraphs [0036]-

[0042] describe a first surface consistent approach to correct for anomalous amplification of the seismic signal due to the presence of sand dunes or other outcropping geobodies in accordance with an embodiment of the disclosure.

Figure 6:
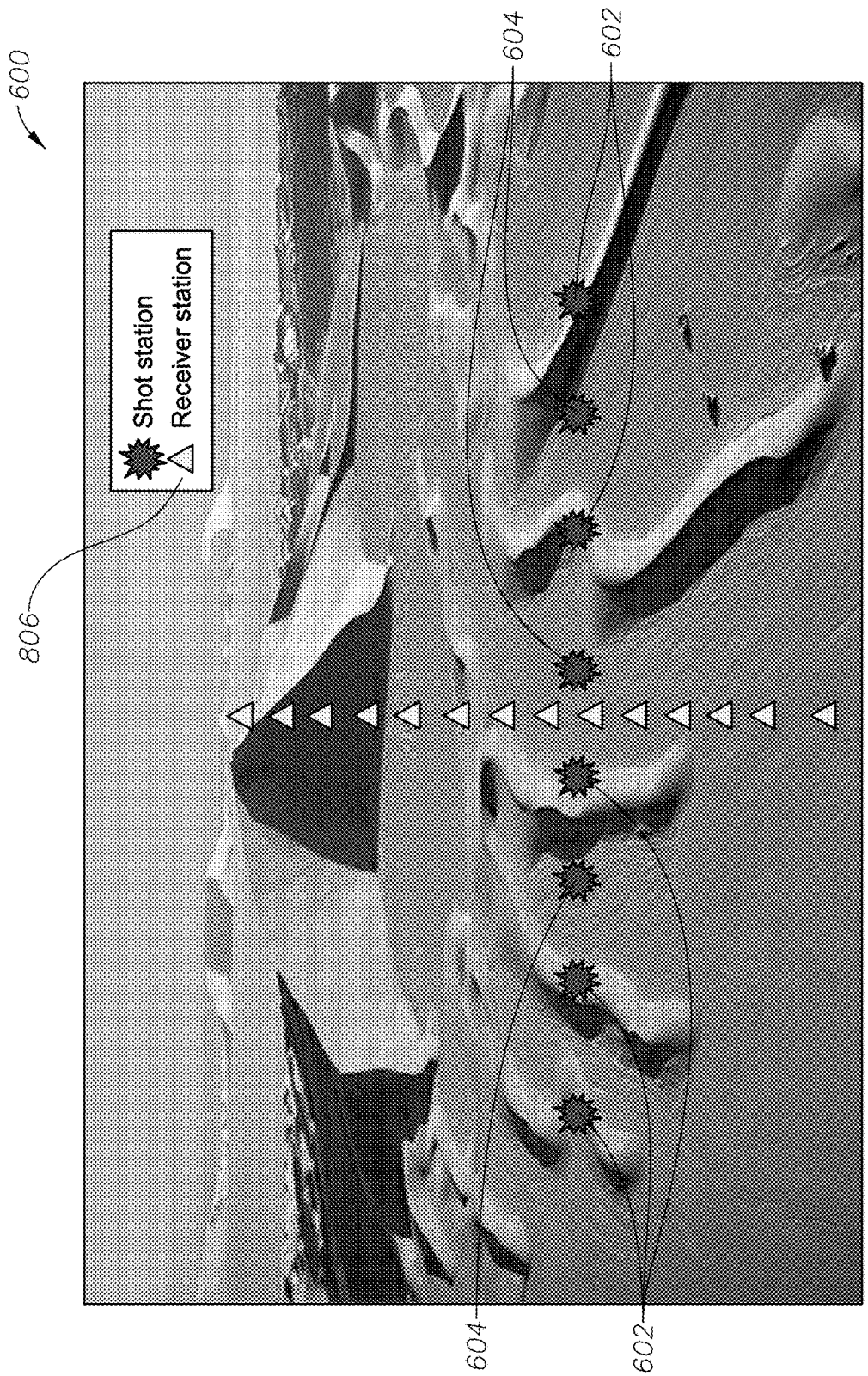
FIG. 6 is a schematic diagram of an example configuration of seismic shot stations and seismic receiver stations in accordance with an example embodiment of the disclosure.

FIG. 6 depicts an example configuration 600 of seismic shot stations 602 and 604 (as represented in FIG. 6 by stars) and seismic receiver stations 606 (as represented in FIG. 6 by triangles) in accordance with an embodiment of the disclosure. As shown in FIG. 6, some seismic stations 602 may be positioned on sand dunes and some seismic stations 604 may be positioned on smooth, flat planes (also referred to as a "sebkhas").

The example configuration depicted in FIG. 6 includes common offsets from a receiver cable. For this example configuration, the frequency dependent site amplification may be estimated by assuming the following seismic models described in Equations 1 and 2 below. In the frequency domain, the seismic traces from the sand dunes, $S_{ij}(\omega)$, may be modeled according to Equation 1:

$$S_{ij}(\omega)=s_i(\omega) \cdot G_{ij}(\omega) \cdot r_j(\omega) \quad (1)$$

Where $s_i(\omega)$ is the source term, $G_{ij}(\omega)$ is the subsurface or geology term, and $r_j(\omega)$ is the site amplification term.

For the receivers in the sebkhas, the site amplification may be assumed to be 1, such that $r_l(\omega)=1$. Thus, the seismic traces from the sebkhas, $S_{kl}(\omega)$, may be modeled according to Equation 2:

$$S_{kl}(\omega)=s_k(\omega) \cdot G_{kl}(\omega) \quad (2)$$

Where $s_k(\omega)$ is the source term and $G_{kl}(\omega)$ is the geology term. After the correction for the site amplification effect, the corrected seismic trace, $S'_{ij}(\omega)$, may be expressed according to Equation 3:

$$S'_{ij}(\omega)=S_{ij}(\omega)/(|A_j(\omega)|+\in) \quad (3)$$

Where $\in$ is a small stabilization factor to avoid a division by zero.

The amplification correction factor $A_j(\omega)$ may be determined as follows: A time gate T may be applied around the first arrival waveform of the offset gather. Using a taper around the gate T, a new offset gather may be generated which only includes the first arrival waveform. Next, the average amplitude (in the frequency domain) of all the traces from receivers located in the sebkha may be determined from the new offset gather by selecting all n traces with receivers located in the sebkhas and determine a reference trace as the average amplitude spectrum. The resulting amplitude spectrum is a reference for the new offset gather and may be represented by Ref($\omega$), as determined according to Equation 4:

$$Ref(\omega)=\Sigma|S_{kl}(\omega)|/n \quad (4)$$

For each trace $S_{ij}(t)$, the corresponding amplitude correction factor (also referred to as the "amplitude scaling factor") may be determined in the frequency domain according to Equation 5:

$$A_j(\omega) = \frac{S_{ij}^T(\omega)}{(Ref(\omega) + \delta)} \quad (5)$$

where $S_{ij}^T(\omega)$ is the Fourier transform of the part of trace $S_{ij}(t)$ delimited by the time gate T, and $\delta$ is a small stabilization factor to avoid a division by zero. This amplitude scaling shown in Equation 5 may computed for each trace with a receiver station on a sand dune and then may be applied to that trace using Equation 3.

Figure 7:
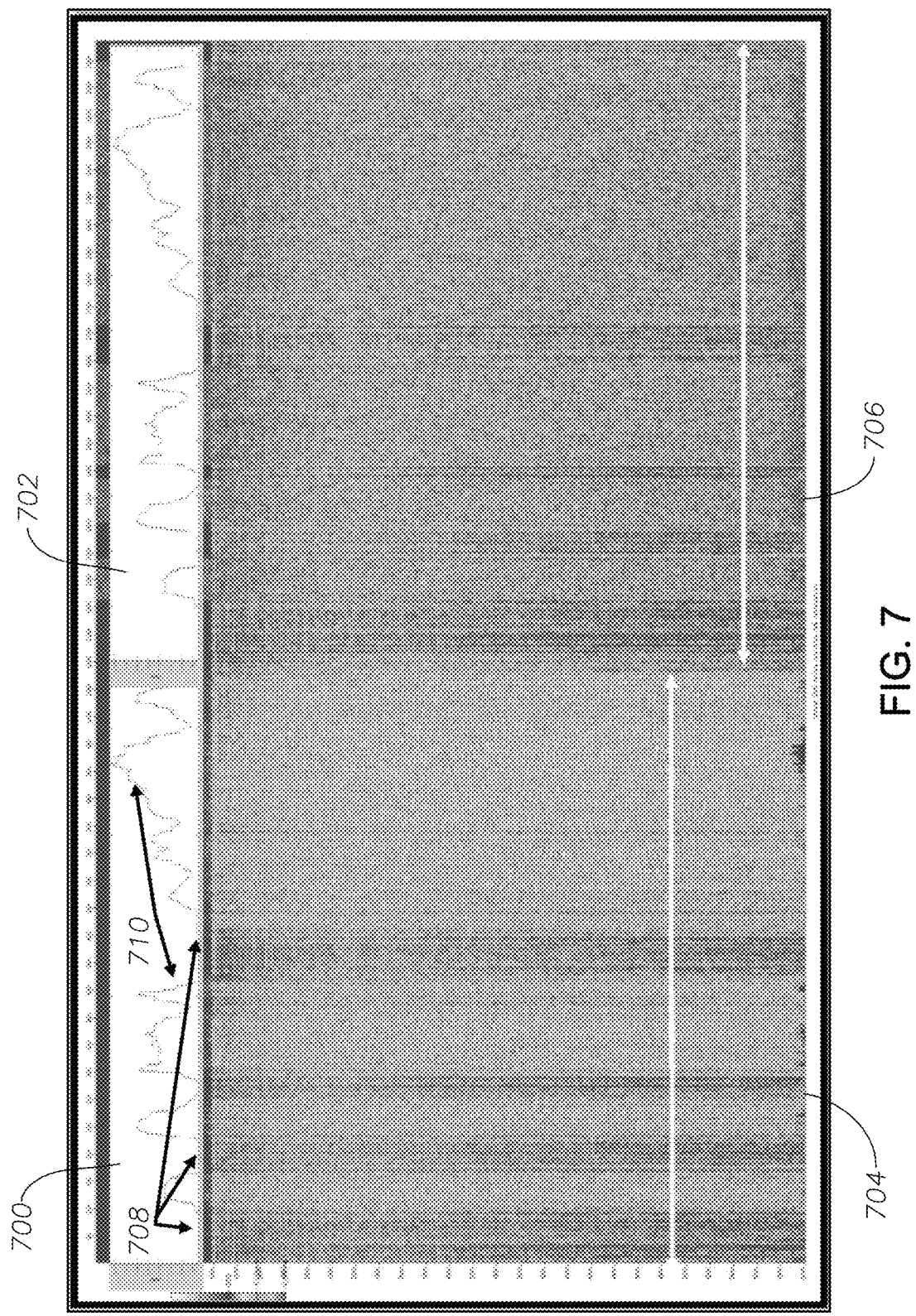
FIG. 7 depicts seismic graphs and corresponding an offset gathers in accordance with an example embodiment of the disclosure.

FIG. 7 depicts seismic graphs 700 and 702 and the offset gathers 704 and 706 in accordance with an embodiment of the disclosure. The left side of FIG. 7 depicts a seismic plot 700 and corresponding offset gather 702 before correction for the site amplification of seismic traces described above. The seismic plot 702 depicts portions 708 associated with salt flats and portions 710 associated with sand dunes. The right side of FIG. 7 depicts a seismic plot 702 and offset gather 706 after correction for the site amplification of seismic signals using the site amplification correction described above in Equation 3.

In some embodiments, the correction of seismic data may include a surface consistent deconvolution and surface amplitude correction for less prominent near-surface geobodies that have less delay time and amplification effects than outcropping geobodies such as sand dunes. Paragraphs [0045]-[0051] describe a surface consistent deconvolution and surface amplitude correction to correct for anomalous amplification of the seismic signal due to the presence of such near-surface features in accordance with another embodiment of the disclosure. In some embodiments, for example, the identification of a sand dune signature, the variable gap deconvolution, and the frequency-dependent amplitude correction described herein may be applied to seismic data to correct for or the seismic amplitude distortion caused by the presence of sand dunes or other outcropping geobodies. After the correction for the effects of sand dunes or other outcropping geobodies, the surface consistent deconvolution and surface amplitude correction described in paragraphs [0045]-[0051] may be applied to seismic data to correct for effects caused by near-surface features having less prominent effects than the sand dunes or other outcropping geobodies.

Figure 8:
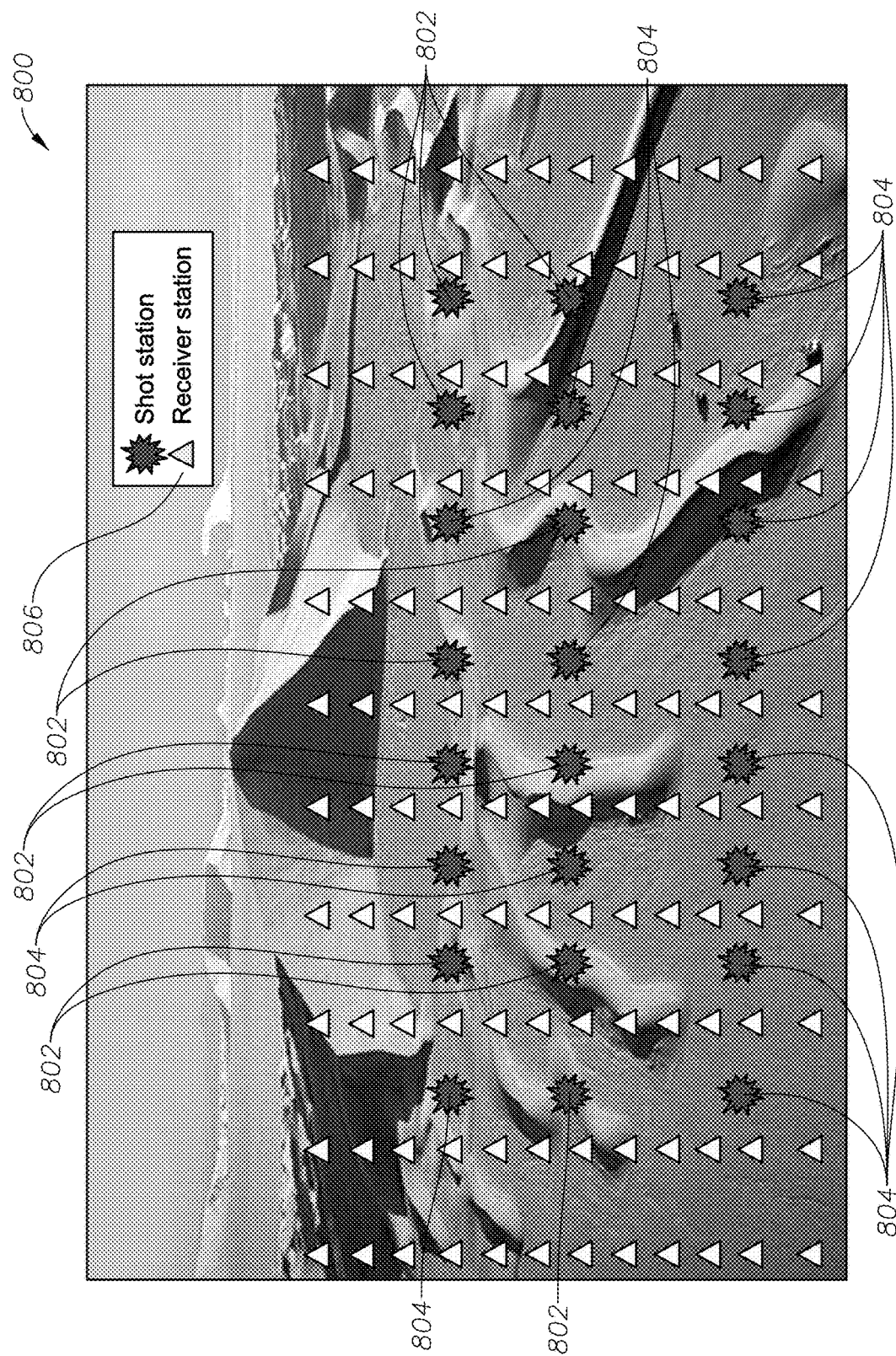
FIG. 8 is a schematic diagram of an example configuration of seismic shot stations and seismic receiver stations in accordance with another example embodiment of the disclosure.

FIG. 8 depicts another example configuration 800 of seismic shot stations 802 and 804 (as represented in FIG. 8 by stars) and seismic receiver stations 806 (as represented in FIG. 8 by triangles) in accordance with an embodiment of the disclosure. As shown in FIG. 8, some seismic stations 802 may be positioned on sand dunes and some seismic stations 804 may be positioned on sebkhas.

For the example configuration 800 depicted in FIG. 8, the logarithm of the amplitude of the seismic traces from the sand dunes may be modeled according to Equation 6:

$$\log|S_{ij}(\omega)|=\log|s_i(\omega)|+\log|G_{ij}(\omega)|+|\log r_j(\omega)| \quad (6)$$

Equation 6 may thus be solved for $G_{ij}$ and $r_j$. As shown below in Equation 7, the receiver term and the geology term may be estimated by assuming that the source term is equal to one for source stations located in the sebkhas, such that $s_i(\omega)=1$:

$$\log|S_{ij}(\omega)|=0+\log|G_{ij}(\omega)|+\log|r_j(\omega) \quad (7)$$

All traces with source stations located in the sebkhas ($s_i(\omega)=1$) may be collected and expressed according to Equation 7 to obtain an overdetermined system of equations that can be solved for $G_{ij}$ and $r_j$ Similarly, as shown below in Equation 8, the source term may be estimated by assuming that the site amplification is equal to one for receiver stations located in sebkhas, such that $r_j(\omega)=1$:

$$\log S_{ij}(\omega)=\log|s_i(\omega)|+\log|G_{ij}(\omega)|+0 \quad (8)$$

All traces with receiver stations located in the sebkhas ($r_j(\omega)=1$) may be collected and expressed according to Equation 8 to obtain an overdetermined system of equations that can be solved system for $G_{ij}$ and $s_i$ Accordingly, to derive the surface consistent amplitude correction, the two overdetermined system of equations formed using Equations 7 and 8 may be iteratively solved for the optimal solutions for $s_i$ and $r_j$. In each iteration, the solution $G_{ij}$ from one of the system of equations may be used as the initial guess for the corresponding solution in the other system of equations. The optimal solutions for $s_i$ and $r_j$ may be used to determine corrected seismic data, $S'_{ij}(\omega)$, having a surface consistent amplitude compensation (SCAC), as shown by Equation 9:

$$S'_{ij}(\omega) = \frac{s_{ij}(\omega)}{(|s_i(\omega)| \cdot |r_j(\omega)| + \epsilon)} \quad (9)$$

The corrected seismic trace thus includes surface consistent amplitude compensation for near-surface amplitude distortions induced by the presence of sand dunes. The resulting data may be used as an input to further surface consistent amplitude correction for near-surface amplitude distortions not related to the sand dune or other outcropping near-surface geobodies as described further below.

In some embodiments, the correction of seismic data may include a surface consistent deconvolution and surface amplitude correction for less prominent near-surface features that have less delay time and amplification effects than outcropping geobodies such as sand dunes. Paragraphs [0056]-[0076] describe a surface consistent deconvolution and surface amplitude correction to correct for anomalous amplification of the seismic signal due to the presence of such near-surface features in accordance with another embodiment of the disclosure. In some embodiments, for example, the identification of a sand dune signature, the variable gap deconvolution, and the frequency-dependent amplitude correction described herein may be applied to seismic data to correct for or the seismic amplitude distortion caused by the presence of sand dunes or other outcropping geobodies. After the correction for the effects of sand dunes or other outcropping geobodies, the surface consistent deconvolution and surface amplitude correction described in paragraphs [0056]-[0076] may be applied to seismic data to correct for effects caused by near-surface features having less prominent effects than the sand dunes or other outcropping geobodies.

As described below, the input to the surface consistent deconvolution and amplitude correction does not require filtering of coherent noise such as multiples and surface waves, and does not require the application of normal move-out (NMO). Accordingly, no velocity data is required for application of the surface consistent deconvolution and amplitude correction to obtain corrected seismic data. Further, the correction terms of the surface consistent deconvolution and amplitude correction do not depend on the order in which the different convolution terms have been derived.

In the discussion below, a seismic trace from an ith source station to a jth receiver station is denoted by $S(i,j)$ and the medium Green's function between source $i$ and receiver $j$ is denoted by $G_{ij}$. By assuming the validity of a convolutional model, a seismic trace may be modeled by Equation 10:

$$S(i,j)(t) = s_i(t) * r_j(t) * G_{ij}(t) \quad (10)$$

Where $s_i(t)$ is the waveform component associated with the source, $r_j(t)$ is the waveform component associated with the receiver, and $G_{ij}(t)$ is the waveform component of the earth impulse response between the locations of the shot and receiver. The seismic trace $S(i,p)$ from the ith source and pth receiver may be described by Equation 11:

$$S(i,p)(t) = s_i(t) * r_p(t) * G_{ip}(t) \quad (11)$$

The pth receiver station may be used as a reference trace for the shot gather. The ratio of the temporal Fourier transforms of Equations 10 and 11 may be expressed by Equation 12:

$$\hat{Q}(i,j,p)(\omega) = \frac{\hat{s}_i(\omega) \cdot \hat{r}_j(\omega) \cdot \hat{G}_{ij}(\omega)}{\hat{s}_i(\omega) \cdot \hat{r}_p(\omega) \cdot \hat{G}_{ip}(\omega)} = \frac{[\hat{s}_i(\omega) \hat{r}_j(\omega)] \cdot \hat{G}_{ij}(\omega)}{[\hat{s}_i(\omega) \hat{r}_p(\omega)] \cdot \hat{G}_{ip}(\omega)} \quad (12)$$

Within a shot gather, the source term $s_i$ may be assumed to be invariant from trace to trace. Thus, the notation for traces may be simplified by replacing $[\hat{s}_i(\omega)\hat{r}_p(\omega)]$ with $[\widehat{sr}_p(\omega)]$ to show that the receiver term is scaled by the invariant source term. Using this notation for traces and collecting the amplitude terms (the real parts of the logarithm of Equation 12), Equation 13 may be derived:

$$\tilde{Q}(i,j,p)(\omega) = \widetilde{sr}_j(\omega) + \tilde{G}_{ij}(\omega) - \widetilde{sr}_p(\omega) - \tilde{G}_{ip}(\omega) \quad (13)$$

The following notations expressed in Equations 14, 15, 16, and 17 may be used in subsequent derivations:

$$\ln [|\hat{s}_i(\omega)\hat{r}_j(\omega)|] = \widetilde{sr}_j(\omega) = \tilde{r}_{ij}(\omega) \quad (14)$$

$$\ln [|\hat{s}_i(\omega)\hat{r}_p(\omega)|] = \widetilde{sr}_p(\omega) = \tilde{r}_{ip}(\omega) \quad (15)$$

$$\ln [|\hat{G}_{ij}(\omega)|] = \tilde{G}_{ij}(\omega) \quad (16)$$

$$\ln [|\hat{G}_{ip}(\omega)|] = \tilde{G}_{ip}(\omega) \quad (17)$$

Where ln is the natural logarithm function. By assuming a weak validity of the source and receiver reciprocity-such that $S(i,j)(t)$ may be different than $S(j,i)(t)$ but $G_{ij}(t) = G_{ji}(t)$ is always true-any discrepancy between reciprocal traces may be attributed to the surface consistent source term $s_i(t)$ and surface consistent receiver term $r_i(t)$. This assumption is equivalent to assuming that the reciprocated source and receiver have different radiation patterns.

Equation 13 may be rewritten with the notations defined in Equations 14, 15, 16, and 17 to be expressed as Equation 18:

$$\tilde{Q}(i,j,p)(\omega) = \tilde{r}_{ij}(\omega) + \tilde{G}_{ij}(\omega) - \tilde{r}_{ip}(\omega) - \tilde{G}_{ip}(\omega) \quad (18)$$

By assuming that the reference trace with index p is the last trace of the shot gather (any trace within the shot gather may be chosen as a reference), Equation 18 may be rewritten for all traces of the shot gather except for the reference trace, as expressed by Equation 19:

$$\begin{pmatrix} 1 & 0 & 0 & 0 & \ldots & -1 & 1 & 0 & 0 & 0 & \ldots & -1 \\ 0 & 1 & 0 & 0 & \ldots & -1 & 0 & 1 & 0 & 0 & \ldots & -1 \\ 0 & 0 & 1 & 0 & \ldots & -1 & 0 & 0 & 1 & 0 & \ldots & -1 \\ 0 & 0 & 0 & 1 & \ldots & -1 & 0 & 0 & 0 & 1 & \ldots & -1 \\ . & . & . & & \ldots & -1 & 0 & 0 & 0 & . & \ldots & -1 \\ . & . & . & & \ldots & -1 & 0 & 0 & 0 & . & \ldots & -1 \\ . & . & . & & \ldots & -1 & 0 & 0 & 0 & . & \ldots & -1 \\ . & . & . & & \ldots & -1 & 0 & 0 & 0 & . & \ldots & -1 \\ . & . & . & & \ldots & -1 & 0 & 0 & 0 & . & \ldots & -1 \\ . & . & . & . & \ldots & 1 & -1 & 0 & 0 & 0 & \ldots & 1 & -1 \end{pmatrix} \begin{pmatrix} \tilde{r}_{i1} \\ \tilde{r}_{i2} \\ \tilde{r}_{i3} \\ . \\ . \\ . \\ \tilde{r}_{ip} \\ \tilde{G}(i,1) \\ \tilde{G}(i,2) \\ . \\ . \\ . \\ \tilde{G}(i,p) \end{pmatrix} = \begin{pmatrix} \tilde{Q}(i,1) \\ \tilde{Q}(i,2) \\ \tilde{Q}(i,3) \\ . \\ . \\ . \\ . \\ \tilde{Q}(i,p-1) \end{pmatrix} \quad (19)$$

Equation 19 may be expressed in matrix notation as Equation 17 below:

$$A\tilde{X}=\tilde{Q} \quad (20)$$

Where A is a sparse matrix with dimensions (p−1)× (2×p), $\tilde{X}$ is a column vector with (2×p) unknowns (consisting of p surface consistent receiver terms scaled by the source term and p earth impulse response components) and $\tilde{Q}$ is a column vector with (p−1) elements derived from the recorded data. The set of matrices expressed by Equation 17 has more unknowns than equations and may be solved by, in some embodiments, using inverse theory to find the pseudo-inverse least squares solution $\tilde{X}_{sol}$ as expressed by Equation 21:

$$\tilde{X}_{sol}=A^T(AA^T)^{-1}\tilde{Q} \quad (21)$$

In other embodiments, other inversion schemes may be used to solve the set of matrices of Equation 20.

From $\tilde{X}_{sol}$, the scaled receiver component terms shown in Equations 14, 15, 16, and 17 may be obtained. Given the estimated solutions for the source scaled receiver terms, the combined surface consistent terms $s_i(t)*r_j(t)$ may be derived using a minimum phase wavelet assumption. In such an embodiment, the derivation of the scaled receiver terms may not take into account the redundancy implied by the surface consistency assumption.

In some embodiments, the surface consistent deconvolution may take advantage of the redundancy implied by a surface consistency assumption by using the equations derived below and discussed in paragraphs [0078]-[0084]. In such embodiments, the scaled receiver terms from each shot i may be expressed according to Equation 22:

$$\ln\left[|\hat{s}_i(\omega)\hat{r}_{ij}(\omega)|\right]=\ln\left[|\hat{s}_i(\omega)|\right]+\ln\left[|\hat{r}_{ij}(\omega)|\right]=\tilde{r}_{ij}(\omega) \quad (22)$$

The set of model equations for shot i may be expressed according to Equation 23 (omitting ω for clarity):

$$\begin{pmatrix} 1 & 1 & 0 & 0 & \ldots & 0 & 0 & 0 & 0 & 0 \\ 1 & 0 & 1 & 0 & \ldots & 0 & 0 & 0 & 0 & 0 \\ 1 & 0 & 0 & 0 & \ldots & 0 & 0 & 0 & 0 & 0 \\ 1 & 0 & 0 & 1 & \ldots & 0 & 0 & 0 & 0 & 0 \\ . & . & . & . & \ldots & 0 & 0 & 0 & 0 & 0 \\ . & . & . & . & \ldots & 0 & 0 & 0 & 0 & 0 \\ 1 & . & . & . & \ldots & 0 & 0 & 0 & 0 & 0 \end{pmatrix} \begin{pmatrix} \ln[|\hat{s}_i(\omega)|] \\ \ln[|\hat{r}_{ij}|] \\ \ln[|\hat{r}_{ij+1}|] \\ . \\ . \\ . \\ \ln[|\hat{r}_{ip}|] \end{pmatrix} = \begin{pmatrix} \tilde{r}_{ij} \\ \tilde{r}_{i(j+1)} \\ . \\ . \\ . \\ \tilde{r}_{ip-1} \end{pmatrix} \quad (23)$$

Equation 23 may be expressed in matrix form as Equation 24:

$$A_i\tilde{X}_i=\tilde{R}_i \quad (24)$$

Where $A_i$ is a sparse matrix with dimensions (p−1)× (p+1), $\tilde{X}_i$ is a column vector with p+1 unknowns (consisting of p surface consistent receiver terms and the source term for shot i). The set of matrices described by Equation 24 from different shots may be combined into a single set of equations. The form of the resulting system of equations and the number of unknowns may depend on the acquisition design, and the resulting system of equations may be expressed in generic matrix form according to Equation 25:

$$B\tilde{Y}=\tilde{R} \quad (25)$$

Where B is a sparse matrix resulting from the combination of the $A_i$'s from different shots, $\tilde{Y}$ is the unknowns column matrix resulting from the combination of the $\tilde{X}_i$'s (accounting for the repeated receiver terms on different shots to reduce its size) and $\tilde{R}$ is a column matrix resulting from the combination of different $\tilde{R}_i$'s.

In some embodiments, the estimated solutions for Equation 25 may be derived using a similar approach to that applied to Equation 20. For example, in some embodiments, Equation 25 may be solved by using inverse theory to find an optimal least-squares solution. In other embodiments, other inversion schemes may be used to solve Equation 25.

From the solutions to Equation 25, the frequency dependent amplitudes of the surface consistent source and receiver terms may be obtained. The actual surface consistent source and receiver waveforms may be obtained under a minimum phase assumption, and a deconvolution operation may be performed to remove their effects and determine the components of the seismic record associated with the $G_{ji}(t)$ terms and that carry the desired information about the sub surface.

Figure 9:
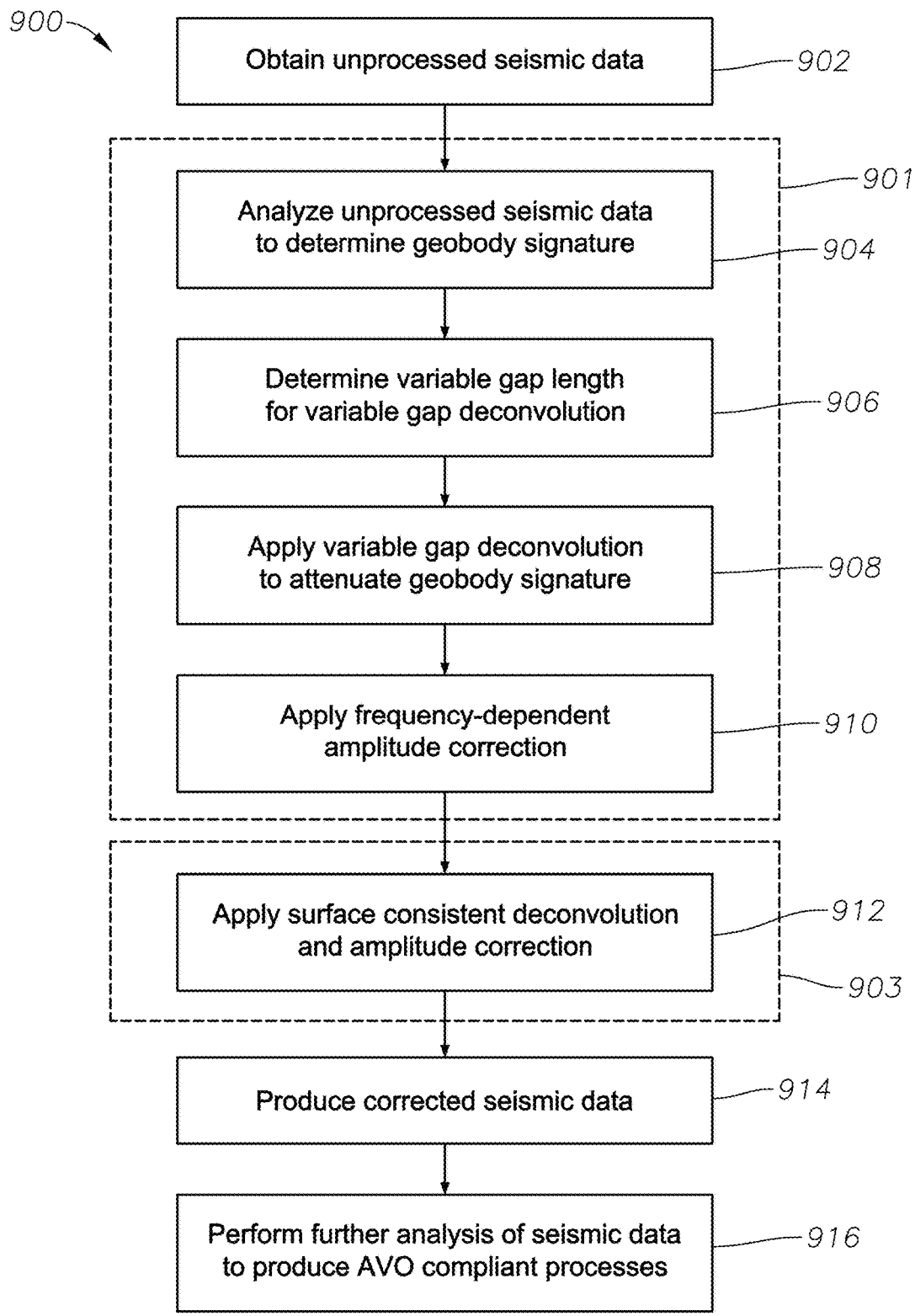
FIG. 9 is a flowchart of a process for processing seismic data to produce corrected seismic data using the techniques described above and in accordance with an embodiment of the disclosure.

FIG. 9 depicts a process 900 for processing seismic data to produce corrected seismic data using the techniques described above and in accordance with an embodiment of the disclosure. As described below, a first portion 901 of the process may correct for effects caused by sand dunes or other outcropping geobodies, and a second portion of the process 902 may correct for less prominent effects caused by near-surface features other than sand dunes and other outcropping geobodies. It should be appreciated that in some embodiments, depending on the seismic data obtained, either portion 901 or 903 of the process 900 may be applied without application of the other portion.

Initially, unprocessed seismic data may be obtained from source and receiver stations (block 902). In some embodiments, some seismic stations may be positioned on outcropping geobodies (e.g., sand dunes) and some seismic stations may be positioned on other surface geological features (e.g., sebkhas). In some embodiments, the unprocessed seismic data may be analyzed without any processing to identify a signature associated with the outcropping geobody from the unprocessed seismic data (block 904). For example, in some embodiments image-recognition (which may refer to or include "object recognition") may be performed on a plot of seismic data to identify a geobody signature, and multiples of the signature, from the data. In some embodiments, the unprocessed seismic data may be sorted in a cross-spread configuration static, such that the autocorrelation sections associated with the same receiver stations or source stations are stacked.

Next, a variable gap length for a variable gap deconvolution may be determined (block 906). In some embodiments, the variable gap length may be determined from the identified geobody signature, i.e., the geometry of the outcropping geobody observed directly from the unprocessed seismic data. In other embodiments, the variable gap length may be determined from sand dune statics derived from the unprocessed seismic data.

After determination of a variable gap length, a variable gap deconvolution may be applied to the unprocessed seismic data to attenuate the sand dune signature (block 908) to generate seismic data in which the undesirable near-surface reverberations between the top and base of a sand dune or other outcropping geobody has been filtered out. Next, the frequency-dependent amplitude correction described herein may be applied to the seismic data (block 910) to correct for the amplification of the seismic waveform caused by sand dunes or other outcropping geobodies. For example, in some embodiments the applied surface consistent amplitude correction may be described by Equation 9.

Next, the surface consistent deconvolution and amplitude correction described herein may be applied to the seismic data (block 912) to correct for the effects caused by near-surface features having less prominent effects than sand dunes or other outcropping geobodies. For example, in some embodiments, the surface consistent deconvolution may be described by Equation 20 which, in some embodiments, may be solved using inverse theory to find a best least squares solution, as described by Equation 21. In other embodiments, the surface consistent deconvolution may account for the redundancy of the surface consistency assumption may be described by Equation 24 and, in some embodiments, may be solved using inverse theory to find a best least squares solution.

Finally, corrected seismic data may be provided (block 914). In some embodiments, further analysis may be performed on the seismic data to produce AVO compliant processes (block 916). In some embodiments, seismic shot stations, seismic receiver stations, or both may be modified based on the corrected seismic data. For example, the position, configuration, or both of seismic shot stations, seismic receiver stations, or both may be modified based on the corrected seismic data.

Figure 10:
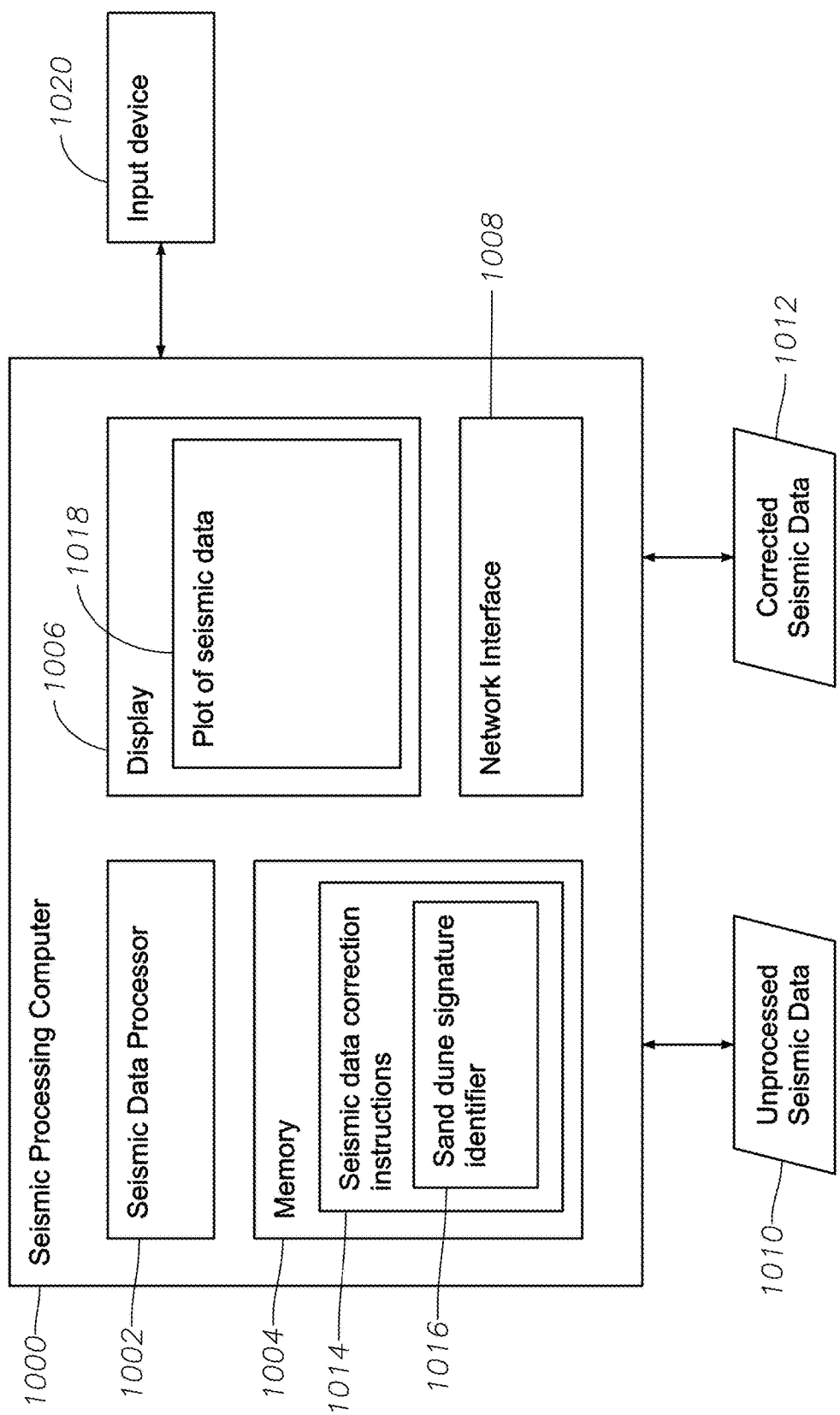
FIG. 10 is a block diagram of a seismic data processing computer in accordance with an embodiment of the disclosure.

FIG. 10 depicts components of a seismic data processing computer 1000 in accordance with an embodiment of the disclosure. In some embodiments, seismic data processing computer 1000 may be in communication with other components of a system for obtaining and producing seismic data. Such other components may include, for example, seismic shot stations (sources) and seismic receiving stations (receivers). As shown in FIG. 10, the seismic data processing computer 1000 may include a seismic data processor 1002, a memory 1004, a display 1006, and a network interface 1008. It should be appreciated that the seismic data processing computer 1000 may include other components that are omitted for clarity. In some embodiments, seismic data processing computer 1000 may include or be a part of a cloud-computing system, a data center, a server rack or other server enclosure, a server, a virtual server, a desktop computer, a laptop computer, a tablet computer, or the like.

The seismic data processor 1002 (as used the disclosure, the term "processor" encompasses microprocessors) may include one or more processors having the capability to receive and process seismic data, such as data received from seismic receiving stations. In some embodiments, the seismic data processor 1002 may include an application-specific integrated circuit (AISC). In some embodiments, the seismic data processor 1002 may include a reduced instruction set (RISC) processor. Additionally, the seismic data processor 1002 may include a single-core processors and multicore processors and may include graphics processors. Multiple processors may be employed to provide for parallel or sequential execution of one or more of the techniques described in the disclosure. The seismic data processor 1002 may receive instructions and data from a memory (for example, memory 1004).

The memory 1004 (which may include one or more tangible non-transitory computer readable storage mediums) may include volatile memory, such as random access memory (RAM), and non-volatile memory, such as ROM, flash memory, a hard drive, any other suitable optical, magnetic, or solid-state storage medium, or a combination thereof. The memory 1004 may be accessible by the seismic data processor 1002. The memory 1004 may store executable computer code. The executable computer code may include computer program instructions for implementing one or more techniques described in the disclosure. For example, the executable computer code may include seismic data correction instructions 1014 to implement one or more embodiments of the present disclosure. In some embodiments, the seismic data correction instructions 1014 may implement one or more elements of process 900 described above and illustrated in FIG. 9. In some embodiments, the seismic data correction instructions 1014 may receive, as input, unprocessed seismic data 1010 and provide, as output, corrected seismic data 1012. The corrected seismic data 1012 may be stored in the memory 1004. In some embodiments, seismic data correction instructions 1014 may include a sand dune signature identifier 1016 that identifies a sand dune signature from the unprocessed seismic data 1010. As described above, for example, the sand dune signature identifier 1016 may include image recognition functionality to recognize a sand dune signature (and mirrors of the sand dune signature) from the unprocessed seismic data 1010.

The display 1006 may include a cathode ray tube (CRT) display, liquid crystal display (LCD), an organic light emitting diode (OLED) display, or other suitable display. The display 1006 may display a user interface (for example, a graphical user interface) that may display information received from the plant information processing computer 1006. In accordance with some embodiments, the display 1006 may be a touch screen and may include or be provided with touch sensitive elements through which a user may interact with the user interface. In some embodiments, the display 1006 may display a graph 1018 of corrected seismic data as determined by the seismic data correction instruction 1010 in accordance with the techniques described herein. In some embodiments, the display 1006 may display a notification in response to the determination of corrected seismic data 1012.

The network interface 1008 may provide for communication between the seismic data processing computer 1000 and other devices. The network interface 1008 may include a wired network interface card (NIC), a wireless (e.g., radio frequency) network interface card, or combination thereof. The network interface 1008 may include circuitry for receiving and sending signals to and from communications networks, such as an antenna system, an RF transceiver, an amplifier, a tuner, an oscillator, a digital signal processor, and so forth. The network interface 1008 may communicate with networks, such as the Internet, an intranet, a wide area network (WAN), a local area network (LAN), a metropolitan area network (MAN) or other networks. Communication over networks may use suitable standards, protocols, and technologies, such as Ethernet Bluetooth, Wireless Fidelity (Wi-Fi) (e.g., IEEE 802.11 standards), and other standards, protocols, and technologies. In some embodiments, for example, the unprocessed seismic data 1010 may be received over a network via the network interface 1008. In some embodiments, for example, the corrected seismic data 1012 may be provided to other devices over the network via the network interface 1008.

In some embodiments, seismic data processing computer may be coupled to an input device 1020 (for example, one or more input devices). The input devices 1020 may include, for example, a keyboard, a mouse, a microphone, or other input devices. In some embodiments, the input device 1020 may enable interaction with a user interface displayed on the display 1006. For example, in some embodiments, the input devices 1020 may enable the entry of inputs that control the acquisition of seismic data, the processing of seismic data, and so on.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described herein. It is to be understood that the forms shown and described herein are to be taken as examples of embodiments. Elements and materials may be substituted for those illustrated and described herein, parts and processes may be reversed or omitted, and certain features may be utilized independently, all as would be apparent to one skilled in the art after having the benefit of this description. Changes may be made in the elements described herein without departing from the spirit and scope of the disclosure as described in the following claims. Headings used herein are for organizational purposes only and are not meant to be used to limit the scope of the description.

What is claimed is:

1. A computer implemented method for producing corrected seismic data from seismic data generated from a plurality of seismic receiver stations configured to sense seismic signals originating from a plurality of seismic source stations, wherein at least one of the plurality of seismic source stations or one of the plurality of seismic receiver stations is positioned on an outcropping geobody, the method comprising:
    obtaining, by a processor, at least one seismic trace, the at least one seismic trace comprising unprocessed seismic data;
    identifying, from the unprocessed seismic data, a signature associated with the geobody, the signature corresponding to a geometry of the geobody;
    performing, by the processor, a variable gap deconvolution to attenuate the signature and generate processed seismic data without near-surface reverberations caused by the outcropping geobody; and
    performing, by the processor, a frequency-dependent amplitude correction on the processed seismic data to produce corrected seismic data, wherein at least one of the plurality of seismic source stations or plurality of seismic receiver stations is positioned on a near-surface feature having less distortion effects than the outcropping geobody and the corrected seismic data comprises first corrected seismic data;
    performing, by the processor, a surface consistent deconvolution and amplitude correction on the corrected seismic data to produce second corrected seismic data.

2. The method of claim 1, wherein the outcropping geobody comprises a sand dune.

3. The method of claim 1, wherein identifying, from unprocessed seismic data, a signature associated with the geobody comprises performing image-recognition on the unprocessed seismic data to identify the signature.

4. The method of claim 1, wherein performing a variable gap deconvolution to attenuate the signature and generate processed seismic data comprises determining a variable gap length from the signature.

5. The method of claim 1, wherein performing the surface consistent deconvolution and amplitude correction on the first corrected seismic data to produce second corrected seismic data comprises:
    scaling a surface consistent receiver term by a source term, the receiver term corresponding to one of the plurality of receiver stations and the source term corresponding to one of the plurality of source stations;
    determining the scaled surface consistent receiver term; and
    determining, using the scaled surface consistent receiver term, a surface consistent source waveform and a surface consistent receiver waveform.

6. The method of claim 1, wherein performing, by the processor, a surface consistent deconvolution and amplitude correction comprises defining as $S(i,j)$ a first seismic trace as a function of time t from an $i^{th}$ source station to a $j^{th}$, such that $S(i,j)$ comprises:

$$S(i,j)(t)=s_i(t)*r_j(t)*G_{ij}(t)$$

wherein $s_i(t)$ is the waveform component associated with the ith source station, $r_j(t)$ is the waveform component associated with the $j^{th}$ receiver station, and $G_{ij}(t)$ is the waveform component of the earth impulse response between the locations of the $i^{th}$ source station and $j^{th}$ receiver station.

7. The method of claim 6, wherein performing, by the processor, a surface consistent deconvolution and amplitude correction comprises defining as $S(i,p)$ a second seismic trace as a function of time t from the $i^{th}$ source and $p^{th}$ receiver, such that $S(i,p)$ comprises:

$$S(i,p)(t)=s_i(t)*r_p(t)*G_{ip}(t)$$

wherein $s_i(t)$ is the waveform component associated with the $i^{th}$ source station, $r_p(t)$ is the waveform component associated with the jth receiver station, and $G_{ip}(t)$ is the waveform component of the earth impulse response between the locations of the $i^{th}$ source station and $j^{th}$ receiver station.

8. The method of claim 7, wherein performing, by the processor, a surface consistent deconvolution and amplitude correction comprises defining $\tilde{Q}(i,j,p)(\omega)$ as the amplitude of a ratio of the temporal Fourier transforms of the first seismic trace and the second seismic trace, such that $\tilde{Q}(i,j,p)(\omega)$ comprises:

$$\tilde{Q}(i,j,p)(\omega)=\widetilde{s_i r_j}(\omega)+\tilde{G}_{ij}(\omega)-\widetilde{s_i r_p}(\omega)-\tilde{G}_{ij}(\omega)$$

wherein $\tilde{r}_{ij}(\omega)=\widehat{s_i r_j}(\omega)=\ln[|\hat{s}_i(\omega)\hat{r}_j(\omega)|]$, $\tilde{r}_{ip}(\omega)=\widehat{s_i r_p}(\omega)=\ln[|\hat{s}_i(\omega)\hat{r}_p(\omega)|]$, and $\tilde{G}_{ij}(\omega)=\ln[|\hat{G}_{ij}(\omega)|]$, and $\tilde{G}_{ip}(\omega)=\ln[|\hat{G}_{ip}(\omega)|]$.

9. The method of claim 8, wherein performing, by the processor, a surface consistent deconvolution and amplitude correction comprises defining p as a last seismic trace of a shot gather, such that $\tilde{Q}(i,j,p)(\omega)$ comprises:

$$\begin{pmatrix} 1 & 0 & 0 & 0 & \ldots & -1 & 1 & 0 & 0 & 0 & \ldots & -1 \\ 0 & 1 & 0 & 0 & \ldots & -1 & 0 & 1 & 0 & 0 & \ldots & -1 \\ 0 & 0 & 1 & 0 & \ldots & -1 & 0 & 0 & 1 & 0 & \ldots & -1 \\ 0 & 0 & 0 & 1 & \ldots & -1 & 0 & 0 & 0 & 1 & \ldots & -1 \\ \cdot & \cdot & \cdot & \cdot & \ldots & -1 & 0 & 0 & 0 & \cdot & \ldots & -1 \\ \cdot & \cdot & \cdot & \cdot & \ldots & -1 & 0 & 0 & 0 & \cdot & \ldots & -1 \\ \cdot & \cdot & \cdot & \cdot & \ldots & -1 & 0 & 0 & 0 & \cdot & \ldots & -1 \\ \cdot & \cdot & \cdot & \cdot & \ldots & -1 & 0 & 0 & 0 & \cdot & \ldots & -1 \\ \cdot & \cdot & \cdot & \cdot & \ldots & -1 & 0 & 0 & 0 & \cdot & \ldots & -1 \\ \cdot & \cdot & \cdot & \cdot & \ldots & 1 & -1 & 0 & 0 & 0 & \ldots & 1 & -1 \end{pmatrix} \begin{pmatrix} \tilde{r}_{i1} \\ \tilde{r}_{i2} \\ \tilde{r}_{i3} \\ \cdot \\ \cdot \\ \cdot \\ \tilde{r}_{ip} \\ \tilde{G}(i,1) \\ \tilde{G}(i,2) \\ \cdot \\ \cdot \\ \tilde{G}(i,p) \end{pmatrix} = \begin{pmatrix} \tilde{Q}(i,1) \\ \tilde{Q}(i,2) \\ \tilde{Q}(i,3) \\ \cdot \\ \cdot \\ \cdot \\ \cdot \\ \tilde{Q}(i,p-1) \end{pmatrix}.$$

10. The method of claim 9, wherein performing, by the processor, a surface consistent deconvolution and amplitude correction comprises defining $\tilde{Q}(i,j,p)(\omega)$ in matrix notation, such that $\tilde{Q}(i,j,p)(\omega)$ comprises:

$$\tilde{Q}=A\tilde{X}$$

Wherein A is a sparse matrix with dimensions (p−1)×(2×p), $\tilde{X}$ is a column vector with (2×p) unknowns (consisting of p surface consistent receiver terms scaled by the source term and p earth impulse response components) and $\tilde{Q}$ is a column vector with (p−1) elements.

11. The method of claim 8, wherein performing, by the processor, a surface consistent deconvolution and amplitude correction comprises defining the scaled receiver term for each shot i as $\tilde{r}_{ij}(\omega)$, such that $\tilde{r}_{ij}(\omega)$ comprises:

$$\begin{pmatrix} 1 & 1 & 0 & 0 & \ldots & 0 & 0 & 0 & 0 \\ 1 & 0 & 1 & 0 & \ldots & 0 & 0 & 0 & 0 \\ 1 & 0 & 0 & 0 & \ldots & 0 & 0 & 0 & 0 \\ 1 & 0 & 0 & 1 & \ldots & 0 & 0 & 0 & 0 \\ \cdot & \cdot & \cdot & \cdot & \ldots & 0 & 0 & 0 & 0 \\ \cdot & \cdot & \cdot & \cdot & \ldots & 0 & 0 & 0 & 0 \\ 1 & \cdot & \cdot & \cdot & \ldots & 0 & 0 & 0 & 0 \end{pmatrix} \begin{pmatrix} \ln[|\hat{s}_i(\omega)|] \\ \ln[|\hat{r}_{ij}|] \\ \ln[|\hat{r}_{ij=1}|] \\ \cdot \\ \cdot \\ \cdot \\ \ln[|\hat{r}_{ip}|] \end{pmatrix} = \begin{pmatrix} \tilde{r}_{ij} \\ \tilde{r}_{i(j+1)} \\ \cdot \\ \cdot \\ \cdot \\ \cdot \\ \tilde{r}_{ip-1} \end{pmatrix}.$$

12. The method of claim 11, wherein performing, by the processor, a surface consistent deconvolution and amplitude correction comprises defining $\tilde{r}_{ij}(\omega)$ in matrix notation, such that $\tilde{r}_{ij}(\omega)$ comprises:

$$\tilde{R}_i = A_i \tilde{X}_i$$

wherein $A_i$ is a sparse matrix with dimensions (p−1)×(p+1), $\tilde{X}_i$ is a column vector with p+1 unknowns (consisting of p surface consistent receiver terms and the source term for shot i).

13. A non-transitory computer-readable storage medium having executable code stored thereon for producing corrected seismic data from seismic data generated from a plurality of seismic receiver stations configured to sense seismic signals originating from a plurality of seismic source stations, wherein at least one of the plurality of seismic source stations or one of the plurality of seismic receiver stations is positioned on an outcropping geobody, the executable code comprising a set of instructions that causes a processor to perform operations comprising:
   obtaining, by the processor, at least one seismic trace, the at least one seismic trace comprising unprocessed seismic data;
   identifying, from the unprocessed seismic data, a signature associated with the geobody, the signature corresponding to a geometry of the geobody;
   performing, by the processor, a variable gap deconvolution to attenuate the signature and generate processed seismic data without near-surface reverberations caused by the outcropping geobody; and
   performing, by the processor, a frequency-dependent amplitude correction on the processed seismic data to produce corrected seismic data, wherein at least one of the plurality of seismic source stations or plurality of seismic receiver stations is positioned on a near-surface feature having less distortion effects than the outcropping geobody and the corrected seismic data comprises first corrected seismic data;
   performing, by the processor, a surface consistent deconvolution and amplitude correction on the corrected seismic data to produce second corrected seismic data.

14. The non-transitory computer-readable storage medium of claim 13, wherein the outcropping geobody comprises a sand dune.

15. The non-transitory computer-readable storage medium of claim 13, wherein identifying, from unprocessed seismic data, a signature associated with the geobody, comprises performing image-recognition on the unprocessed seismic data to identify the signature.

16. The non-transitory computer-readable storage medium of claim 13, wherein performing a variable gap deconvolution to attenuate the signature and generate processed seismic data comprises determining a variable gap length from the signature.

17. The non-transitory computer-readable storage medium of claim 13, wherein performing a surface consistent deconvolution and amplitude correction on the attenuated seismic data to produce corrected seismic data comprises:

scaling a surface consistent receiver term by a source term, the receiver term corresponding to one of the plurality of receiver stations and the source term corresponding to one of the plurality of source stations;

determining the scaled surface consistent receiver term; and determining using the scaled surface consistent receiver term, a surface consistent source waveform and a surface consistent receiver waveform.

18. A system, comprising:

a plurality of seismic source stations, wherein at least one of the plurality of seismic source stations is positioned on an outcropping geobody;

a plurality of seismic receiver stations configured to sense seismic signals originating from the plurality of seismic source stations;

a seismic data processor;

a non-transitory computer-readable storage memory accessible by the seismic data processor and having executable code stored thereon for producing corrected seismic data from seismic data generated from the plurality of seismic receiver stations, the executable code comprising a set of instructions that causes the seismic data processor to perform operations comprising:

obtaining at least one seismic trace, the at least one seismic trace comprising unprocessed seismic data;

identifying, from the unprocessed seismic data, a signature associated with the geobody, the signature corresponding to a geometry of the geobody;

performing a variable gap deconvolution to attenuate the signature and generate processed seismic data without near-surface reverberations caused by the outcropping geobody; and performing a frequency-dependent amplitude correction on the processed seismic data to produce corrected seismic data, wherein at least one of the plurality of seismic source stations or plurality of seismic receiver stations is positioned on a near-surface feature having less distortion effects than the outcropping geobody and the corrected seismic data comprises first corrected seismic data;

performing, by the processor, a surface consistent deconvolution and amplitude correction on the corrected seismic data to produce second corrected seismic data.

19. The system of claim 18, wherein the outcropping geobody comprises a sand dune.

20. The system of claim 18, wherein identifying, from unprocessed seismic data, a signature associated with the geobody, comprises performing image-recognition on the unprocessed seismic data to identify the signature.

21. The system of claim 18, wherein performing a variable gap deconvolution to attenuate the signature and generate processed seismic data comprises determining a variable gap length from the signature.

22. The system of claim 18, wherein performing a surface consistent deconvolution and amplitude correction on the attenuated seismic data to produce corrected seismic data comprises:

scaling a surface consistent receiver term by a source term, the receiver term corresponding to one of the plurality of receiver stations and the source term corresponding to one of the plurality of source stations;

determining the scaled surface consistent receiver term; and determining using the scaled surface consistent receiver term, a surface consistent source waveform and a surface consistent receiver waveform.

* * * * *